(12) United States Patent
Witherbee

(10) Patent No.: US 8,658,894 B1
(45) Date of Patent: Feb. 25, 2014

(54) COVER ASSEMBLY FOR AN ELECTRICAL BOX

(75) Inventor: Martin L. Witherbee, Godfrey, IL (US)

(73) Assignee: Cooper Technologies Company, Houston, TX (US)

( * ) Notice: Subject to any disclaimer, the term of this patent is extended or adjusted under 35 U.S.C. 154(b) by 137 days.

(21) Appl. No.: 13/212,656

(22) Filed: Aug. 18, 2011

Related U.S. Application Data

(60) Provisional application No. 61/382,649, filed on Sep. 14, 2010.

(51) Int. Cl.
*H02G 3/14* (2006.01)

(52) U.S. Cl.
USPC .................. 174/58; 174/50; 174/53; 174/67

(58) Field of Classification Search
USPC .............. 174/50, 53, 58, 67; 220/3.2, 3.3, 3.5
See application file for complete search history.

(56) References Cited

U.S. PATENT DOCUMENTS

| | | | |
|---|---|---|---|
| 754,414 | A | 3/1904 | Bossert |
| 1,024,902 | A | 4/1912 | Kronberger |
| 1,724,307 | A | 8/1929 | Peterson |
| 1,875,101 | A | 8/1932 | Morrell |
| 1,935,565 | A | 11/1933 | Goetzelman |
| 1,956,196 | A | 4/1934 | Korab |
| 2,204,006 | A | 6/1940 | Allen |
| 2,297,862 | A | 10/1942 | Bachmann |
| 2,378,861 | A | 6/1945 | Peevey |
| 2,707,221 | A | 4/1955 | Frank |
| 2,791,345 | A | 5/1957 | Troutman |
| 2,989,206 | A | 6/1961 | McAfee |
| 3,015,408 | A | 1/1962 | Campbell |
| 3,059,803 | A | 10/1962 | Holsinger |

(Continued)

FOREIGN PATENT DOCUMENTS

| | | |
|---|---|---|
| EP | 1542326 A2 | 6/2005 |
| GB | 2392786 A | 10/2004 |

(Continued)

OTHER PUBLICATIONS

Orbit, web page regarding 4S Adjustable Rings & Universal Box Brackets, Catalog 33, A13, 1 page.

(Continued)

*Primary Examiner* — Hoa C Nguyen
*Assistant Examiner* — Paresh Paghadal
(74) *Attorney, Agent, or Firm* — Senniger Powers LLP

(57) ABSTRACT

A temporary cover for covering a central opening in an electrical box cover plate is disclosed. The cover has a front wall, a side wall forming a rim around the periphery of the front wall, a connecting mechanism on the rim for releasably connecting the temporary cover to the box cover plate in a position in which the front wall of the temporary cover is spaced forward from the central opening in the box cover plate, and a release mechanism on the front wall for removing the temporary cover from the box cover plate. The rim of the temporary cover is configured to function as a guide for guiding a cutting tool to cut an opening in the wall member prior to installing an electrical device in the electrical box. A cover assembly including such a temporary cover is also disclosed.

11 Claims, 37 Drawing Sheets

(56) References Cited

U.S. PATENT DOCUMENTS

| Patent No. | Date | Name | Ref |
|---|---|---|---|
| 3,115,265 A | 12/1963 | Mulkey | |
| 3,438,536 A | 4/1969 | Tarchalski | |
| 3,619,477 A | 11/1971 | Rasmussen | |
| 3,620,404 A | 11/1971 | Grasso | |
| 3,662,085 A | 5/1972 | Robinson | |
| 3,814,834 A | 6/1974 | Glader | |
| 3,885,852 A | 5/1975 | Grove | |
| 3,899,101 A | 8/1975 | Keating | |
| 4,098,423 A | 7/1978 | Marrero | |
| 4,134,636 A | 1/1979 | Kleinatland | |
| 4,247,738 A | 1/1981 | Bonato | |
| 4,273,957 A | 6/1981 | Kolling, Jr. | |
| D261,135 S | 10/1981 | Horne | |
| 4,599,485 A | 7/1986 | Smolik | |
| 4,634,015 A | 1/1987 | Taylor | |
| 4,842,551 A | 6/1989 | Heimann | |
| 4,907,711 A | 3/1990 | Stuchlik, III | |
| 4,918,259 A | 4/1990 | Hanson | |
| 4,953,733 A | 9/1990 | Loscuito | |
| 4,979,633 A | 12/1990 | Lakey | |
| 5,003,128 A | 3/1991 | Grondin | |
| 5,012,043 A | 4/1991 | Seymour | |
| 5,063,872 A | 11/1991 | Maus | |
| 5,064,386 A | 11/1991 | Dale | |
| 5,117,996 A | 6/1992 | McShane | |
| 5,223,673 A | 6/1993 | Mason | |
| D345,142 S | 3/1994 | Porter | |
| 5,301,437 A * | 4/1994 | Burke | 33/562 |
| 5,359,152 A | 10/1994 | Hone-Lin | |
| 5,375,728 A | 12/1994 | West | |
| 5,415,564 A | 5/1995 | Winter | |
| 5,432,298 A | 7/1995 | Thompson | |
| D361,059 S | 8/1995 | De Waal | |
| D364,849 S | 12/1995 | De Waal | |
| 5,526,952 A | 6/1996 | Green | |
| 5,547,095 A | 8/1996 | Sonntag | |
| 5,562,222 A | 10/1996 | Jordan | |
| 5,571,993 A | 11/1996 | Jones | |
| 5,639,991 A | 6/1997 | Schuette | |
| 5,710,392 A | 1/1998 | Bordwell | |
| 5,783,774 A | 7/1998 | Bowman | |
| 5,902,960 A | 5/1999 | Smith | |
| 5,913,439 A | 6/1999 | Von Arx | |
| 5,931,325 A | 8/1999 | Filipov | |
| 5,959,246 A | 9/1999 | Gretz | |
| 5,975,323 A | 11/1999 | Turan | |
| 6,005,190 A | 12/1999 | Stark | |
| 6,103,974 A | 8/2000 | Erdfarb | |
| 6,166,329 A | 12/2000 | Oliver | |
| 6,180,879 B1 | 1/2001 | Gretz | |
| 6,204,447 B1 | 3/2001 | Gretz | |
| 6,307,154 B1 | 10/2001 | Gretz | |
| 6,313,404 B1 | 11/2001 | Yu | |
| 6,369,322 B1 | 4/2002 | Gretz | |
| 6,376,770 B1 | 4/2002 | Hyde | |
| 6,462,278 B1 | 10/2002 | Vrame | |
| 6,479,749 B1 | 11/2002 | Vrame | |
| 6,520,363 B1 | 2/2003 | Sullivan | |
| 6,538,202 B1 | 3/2003 | Shaffer | |
| 6,586,679 B2 | 7/2003 | Bashford | |
| 6,608,252 B2 | 8/2003 | Hurley | |
| 6,617,511 B2 | 9/2003 | Schultz | |
| 6,653,566 B2 | 11/2003 | Petak | |
| 6,681,948 B1 | 1/2004 | Santa Cruz | |
| 6,683,248 B1 | 1/2004 | Vrame | |
| 6,686,540 B2 | 2/2004 | Compagnone, Jr. | |
| 6,737,576 B1 | 5/2004 | Dinh | |
| 6,768,055 B1 | 7/2004 | Gorin | |
| 6,806,425 B1 | 10/2004 | O'Neill | |
| 6,820,760 B2 | 11/2004 | Wegner | |
| 6,867,369 B2 | 3/2005 | Wiggins | |
| 6,867,370 B2 | 3/2005 | Compagnone, Jr. | |
| 6,870,099 B1 | 3/2005 | Schultz | |
| 6,878,877 B1 | 4/2005 | Cozzi | |
| 6,906,260 B2 * | 6/2005 | Grendahl | 174/66 |
| 6,927,341 B1 | 8/2005 | Crane | |
| 6,949,708 B1 | 9/2005 | Hausen | |
| 6,953,894 B2 | 10/2005 | Ungerman | |
| 6,998,531 B2 | 2/2006 | Hull | |
| 7,002,076 B2 | 2/2006 | Ungerman | |
| 7,012,079 B1 * | 3/2006 | Lavergne et al. | 514/279 |
| 7,034,222 B1 | 4/2006 | York | |
| 7,067,738 B1 | 6/2006 | Shotey | |
| 7,071,413 B1 | 7/2006 | Paape | |
| 7,075,008 B2 | 7/2006 | Smith | |
| 7,077,280 B1 | 7/2006 | Gretz | |
| 7,087,837 B1 | 8/2006 | Gretz | |
| D528,513 S | 9/2006 | Grendahl | |
| 7,102,079 B1 * | 9/2006 | Kurtin | 174/58 |
| 7,109,419 B1 | 9/2006 | Gretz | |
| 7,189,928 B2 | 3/2007 | Denier | |
| 7,235,739 B2 | 6/2007 | King, Jr. | |
| 7,265,291 B1 | 9/2007 | Gorman | |
| 7,273,982 B1 | 9/2007 | Lalancette | |
| 7,276,661 B2 | 10/2007 | Wegner | |
| 7,301,099 B1 | 11/2007 | Korcz | |
| 7,312,396 B1 | 12/2007 | Gorman | |
| 7,350,659 B1 | 4/2008 | Gretz | |
| 7,388,162 B1 | 6/2008 | Gretz | |
| 7,390,965 B2 | 6/2008 | Hartwig | |
| 7,414,193 B1 | 8/2008 | Le | |
| 7,425,677 B2 | 9/2008 | Gates | |
| 7,432,444 B1 | 10/2008 | McCusker | |
| 7,442,874 B2 | 10/2008 | Compagnone, Jr. | |
| 7,449,633 B2 | 11/2008 | Lalancette | |
| 7,464,486 B2 | 12/2008 | Kubodera | |
| 7,468,486 B2 * | 12/2008 | Yan | 174/58 |
| 7,476,803 B2 | 1/2009 | Dinh | |
| 7,495,170 B2 | 2/2009 | Dinh | |
| 7,497,273 B2 | 3/2009 | Schoettle | |
| 7,528,322 B1 | 5/2009 | Gretz | |
| 7,531,743 B2 | 5/2009 | Johnson | |
| 7,531,745 B1 | 5/2009 | Gretz | |
| 7,541,539 B2 | 6/2009 | Le | |
| 7,563,978 B2 | 7/2009 | Lalancette | |
| 7,572,977 B2 | 8/2009 | Gorman | |
| 7,582,827 B1 | 9/2009 | Gretz | |
| 7,608,781 B2 | 10/2009 | Compagnone, Jr. | |
| 7,645,936 B2 | 1/2010 | Magno, Jr. | |
| 7,645,937 B2 | 1/2010 | Bhosale | |
| 7,816,604 B1 * | 10/2010 | Gretz | 174/58 |
| 2002/0066581 A1 | 6/2002 | Bashford | |
| 2002/0179317 A1 | 12/2002 | Hurley | |
| 2002/0185296 A1 | 12/2002 | Schultz | |
| 2003/0014939 A1 | 1/2003 | DeWall | |
| 2003/0213801 A1 | 11/2003 | Bradley | |
| 2005/0194172 A1 | 9/2005 | Ungerman | |
| 2005/0230139 A1 | 10/2005 | Ungerman | |
| 2006/0054339 A1 | 3/2006 | Domeyer | |
| 2007/0045308 A1 | 3/2007 | Lalancette | |
| 2007/0107924 A1 | 5/2007 | King, Jr. | |
| 2007/0181328 A1 | 8/2007 | Dinh | |
| 2008/0035363 A1 | 2/2008 | Yan | |
| 2008/0041848 A1 | 2/2008 | Denier | |
| 2008/0047729 A1 | 2/2008 | Wegner | |
| 2008/0053698 A1 | 3/2008 | Purves | |
| 2008/0190638 A1 | 8/2008 | Le | |
| 2008/0289845 A1 | 11/2008 | Le | |
| 2009/0008120 A1 | 1/2009 | Gates | |
| 2009/0021895 A1 | 1/2009 | Purves | |
| 2009/0057303 A1 | 3/2009 | Oddsen | |
| 2009/0166053 A1 | 7/2009 | Magno, Jr. | |
| 2009/0173513 A1 * | 7/2009 | Petak | 174/66 |
| 2009/0183891 A1 | 7/2009 | Kramer, Jr. | |
| 2009/0272558 A1 | 11/2009 | Compagnone, Jr. | |
| 2009/0321433 A1 | 12/2009 | Colligan | |
| 2010/0084155 A1 * | 4/2010 | Jafari | 174/58 |

FOREIGN PATENT DOCUMENTS

| | | | |
|---|---|---|---|
| WO | 9505022 A1 | 2/1995 | |
| WO | 9935726 A1 | 7/1999 | |
| WO | 2008098263 A2 | 8/2008 | |

(56) References Cited

FOREIGN PATENT DOCUMENTS

WO 2009091797 A1 7/2009

OTHER PUBLICATIONS

Protect, Product Catalog 2008, Wiring America with Innovation, 20 pages.

Carlon, Carlon Zip Box Blue Switch and Outlet Boxes, Innovation Solutions for Wire and Cable Management Catalog, Jun. 2006, 22 pages.

Non-Final Office Action dated Apr. 24, 2013 relating to U.S. Appl. No. 13/212,634, 32 pages.

\* cited by examiner

COVER ASSEMBLY FOR AN ELECTRICAL BOX

CROSS-REFERENCE TO RELATED APPLICATION

This application is a Non-Provisional Patent Application and claims priority from U.S. Provisional Patent Application Ser. No. 61/382,649 filed Sep. 14, 2010, which is incorporated herein by reference.

FIELD OF THE INVENTION

The present invention generally relates to the installation of electrical devices (e.g., switches, outlets, telephone jacks, and computer jacks) in an electrical junction box mounted in a wall.

BACKGROUND OF THE INVENTION

The conventional process for installing an electrical device, e.g., a light switch, outlet, or telephone/computer jack, in a junction box involves mounting the junction box on a wall stud before the drywall in installed, mounting the electrical device on a box cover plate (often referred to as a "mud ring"), connecting the wiring of the device to the wiring in the junction box, securing the box cover plate and the device to the junction box, and attaching a cover plate to the electrical device to cover and protect the assembly. The drywall (or other type of wall) is installed at a later time, sometimes days or even weeks or months later. An opening is cut in the drywall to reveal the electrical device.

The above process has drawbacks. For example, if the thickness of the drywall is changed after installation of the electrical device, the mud rings must be replaced. Further, the electrical device must be installed at an early stage of the process, even though there may be a substantial delay before the installation process is finally finished. The purchase of materials, including expensive electrical devices, long before they are actually ready for use is undesirable from the standpoint of cash flow, especially where a job requires many such devices. Also, there may be design changes after the dry wall is installed, such as a change in the type of finish cover plate to be used, which can affect the configuration of the electrical device. There is also a risk of damage to the electrical device prior to and during installation and trim-up of the dry wall. In such cases the installed electrical device may have to be replaced by a substitute device, which is a costly process. Attempts have been made to solve some of these problems by using adjustable-depth mud rings and junction boxes, as described for example, in U.S. Pat. Nos. 7,572,977, 7,531,743, 7,468,486, 7,189,928, 6,820,760, and 5,931,325. However, the adjustment of these components typically requires the use of multiple threaded screws, the manipulation of which is inconvenient and time-consuming. Moreover, the adjustability of these components does not address all of the problems arising from last-minute design changes and/or a substantial delay between the time the electrical devices are installed and the time they are actually ready to use, nor the risk of damage to the electrical device prior to completion of the drywall installation and trim-up process.

SUMMARY OF THE INVENTION

In one embodiment, the invention is directed to a cover assembly for an electrical box that is accessible through a wall opening in a wall member disposed forward of the electrical box. The cover assembly comprises a box cover plate having a central opening without a forward protruding collar around it. The box cover plate is adapted to be mounted on a front side of the electrical box and rearward of the wall member with the central opening in registration with a recess in the electrical box and the wall opening. Spring detent devices are provided on the box cover plate at opposite edges of the central opening for engaging an extension ring received in the central opening of the mud ring. At least one grounding tab extends rearward from an edge of the central opening of the box cover plate and is configured for electrical grounding engagement with the extension ring. The cover assembly also includes a temporary cover for covering the central opening in the box cover plate. The temporary cover comprises a front wall, a side wall extending rearward from the front wall and forming a rim around the periphery of the front wall, and a connecting mechanism on the rim for releasably connecting the temporary cover to the box cover plate in a position in which the front wall of the temporary cover is spaced forward from the central opening in the box cover plate. A release mechanism is provided on the front wall for removing the temporary cover from the box cover plate. The rim is configured to function as a guide for guiding a cutting tool to cut an opening in the wall member prior to installing an electrical device in the electrical box.

This invention is also directed to the temporary cover described in the preceding paragraph.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
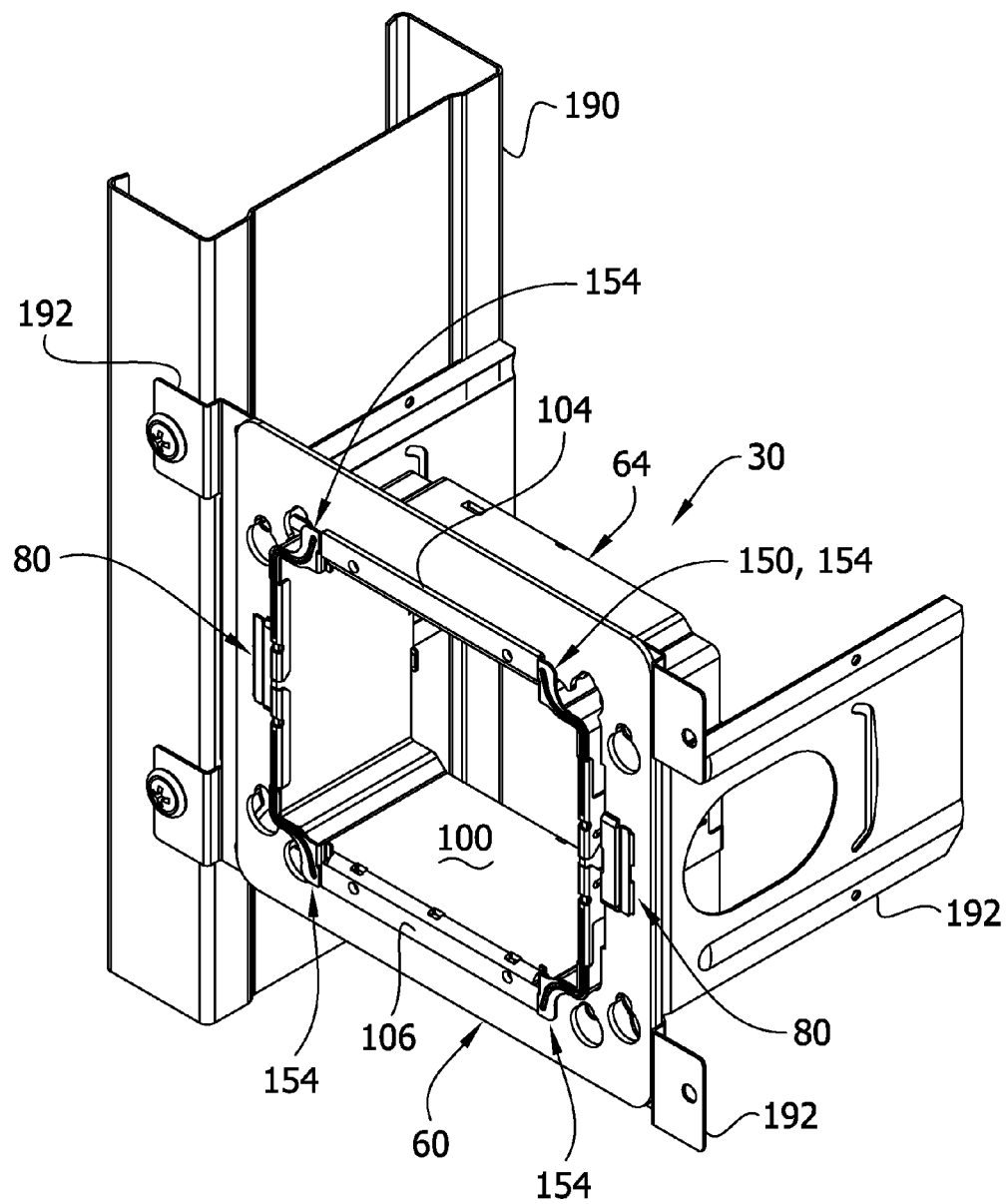
FIG. 1 is a perspective view of one embodiment of an adjustable-depth ring assembly of this invention.
Figure 13:
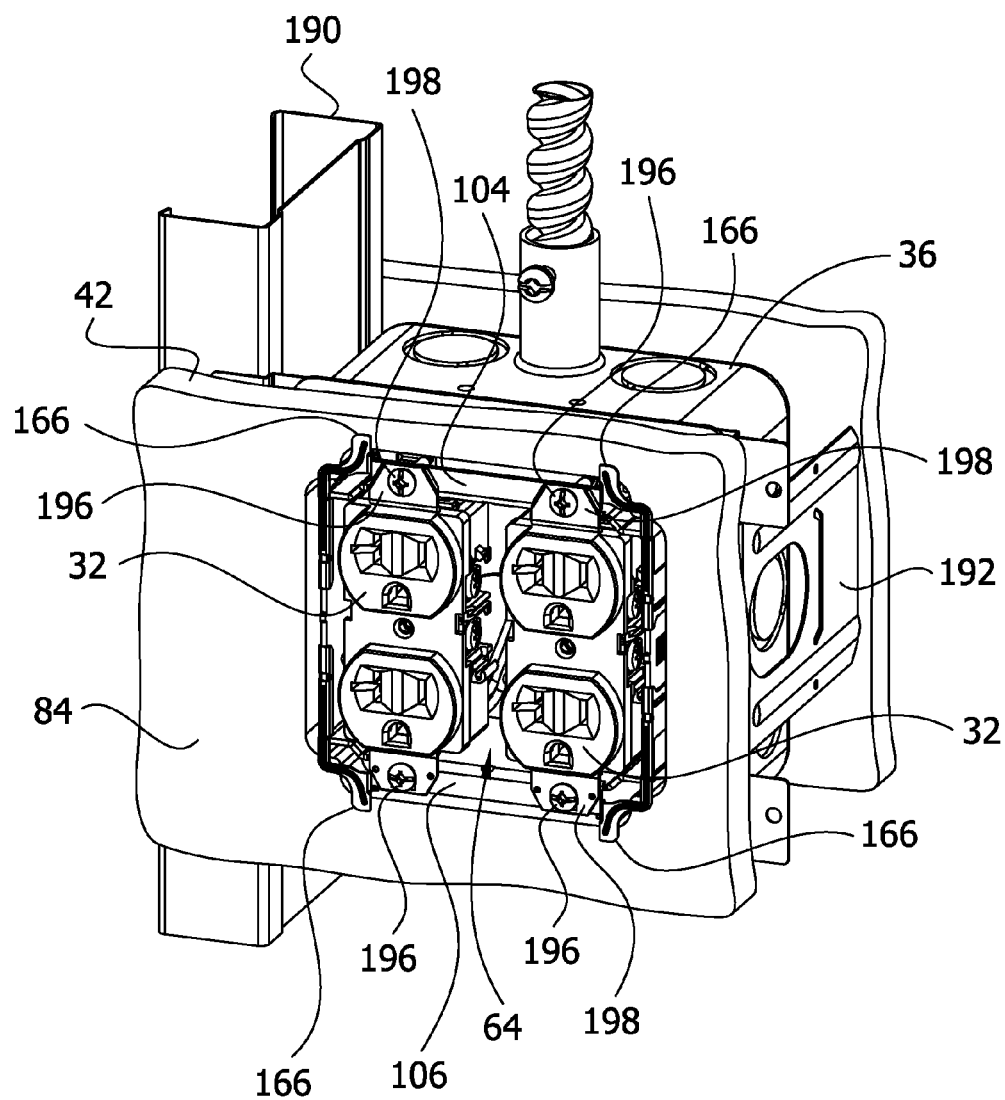
Figure 14:
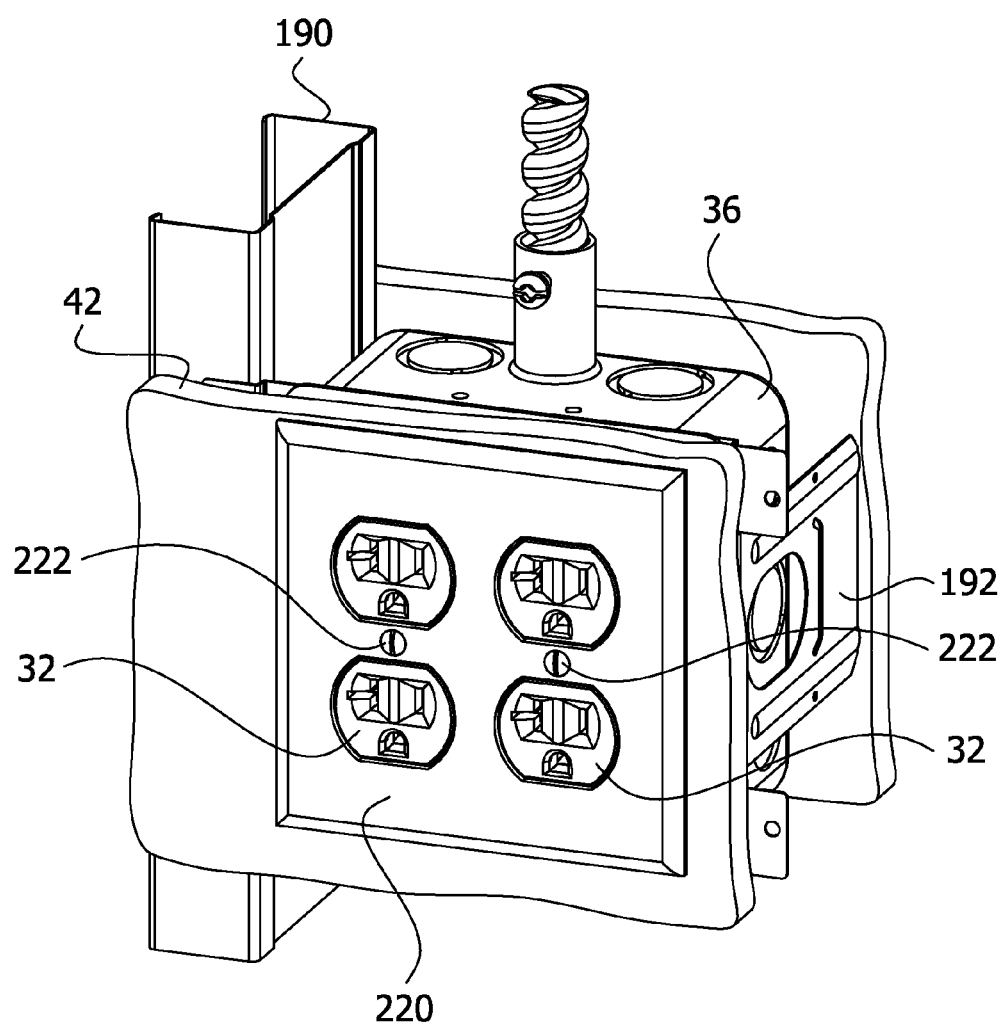

Referring to the drawings, FIG. 1 shows one embodiment an adjustable-depth ring assembly of this invention, generally designated 30. As shown in FIG. 13, the assembly 30 is used for mounting an electrical device 32 such as a switch, outlet, jack, etc., in an electrical junction box 36 (hereinafter referred to as an electrical box, or junction box, or simply box) that is accessible through a wall opening 38 in a wall member 42 disposed forward of the box. The electrical box 36 illustrated in FIGS. 2 and 13 has a front opening 50 and a cavity 52 that are sized for receiving two electrical devices 32 positioned side-by-side, but this number may vary from one to two, three, four or more devices, as will be understood by those skilled in this field. The box 36 is generally rectangular as illustrated but may have other shapes.

In general, the adjustable-depth ring assembly 30 comprises a box cover plate 60 sized to fit the electrical box 36 and an extension ring 64 received in a central opening 66 of the box cover plate. The extension ring 64 is movable in the opening 66 relative to the box cover plate 60 along a central axis 70 extending in front-to-back direction such that an axial distance between a front 74 of the extension ring and the box cover plate can be adjusted to accommodate wall members of different thicknesses. Spring detents 80 are provided on one of the box cover plate 60 and extension ring 64 for engaging the other of the box cover plate and extension ring. The spring detents 80 are operable to allow the extension ring 64 to be pushed in a rearward direction relative to the box cover plate to an installed position (FIG. 13) in which the front 74 of the extension ring is generally flush with a front surface 84 of the wall member 42. The detents 80 are also operable to resist movement of the extension ring in a forward direction away from the installed position. (As used herein, movement in the "forward" direction is movement along axis 70 toward the left in FIG. 2, and movement in the "rearward" direction is movement along axis 70 toward the right in FIG. 2.) Each of the elements of the assembly 30 and its operation are described below.

In the first embodiment of FIGS. 1-14, the box cover plate 60 is a flat generally planar rigid plate of suitable material (e.g., metal) having conventional fastener openings 88 around its periphery for receiving fasteners to fasten the box cover plate to the electrical box 36. The number, shape and configuration of these openings 88 can vary. The central opening 66 in the box cover plate 60 has a shape (e.g., rectangular, round, or octagonal) and size that generally match the opening 50 at the front of the electrical box 36. It will be understood in this regard that the box cover plate 60 can be sized for one electrical device or multiple electrical devices (e.g., two, three, four or more) depending on the size and wiring configuration of the electrical box 36.

The extension ring 64 is substantially rigid and of suitable material such as metal (e.g., galvanized steel). The ring 64 has top, bottom and side walls 90, 92, 94 extending rearward from the front 74 of the ring. The walls define a generally rectangular cavity 100 for receiving at least one electrical device 32. It will be understood in this regard that the extension ring 64 can be sized for one electrical device 32 or multiple electrical devices (e.g., two, three, four or more) depending on the size and wiring configuration of the junction box 36. At least one fastener opening 102 and desirably multiple fastener openings are provided in upper and lower flanges 104, 106 of the ring 64 for receiving fasteners to fasten the electrical device(s) 32 to the ring. These flanges 104, 106 are generally co-planar with one another and with the front 74 of the extension ring 64. The ring 64 comprises two halves swaged together, but it may be formed as one part or more than two parts. The central axis 70 of the ring 64 is generally coincident with the central axis of the box cover plate 60, and the ring is shaped and sized for a close-clearance sliding fit inside the central opening 66 of the box cover plate to permit forward and rearward movement of the extension ring relative to the cover plate. Each of the two side walls 94 of the extension ring has a series of closely-spaced parallel vertical grooves 112 arranged as a row extending in an axial direction with respect to the ring. These grooves cooperate with the spring detents 80 in a manner described below.

Figure 2:
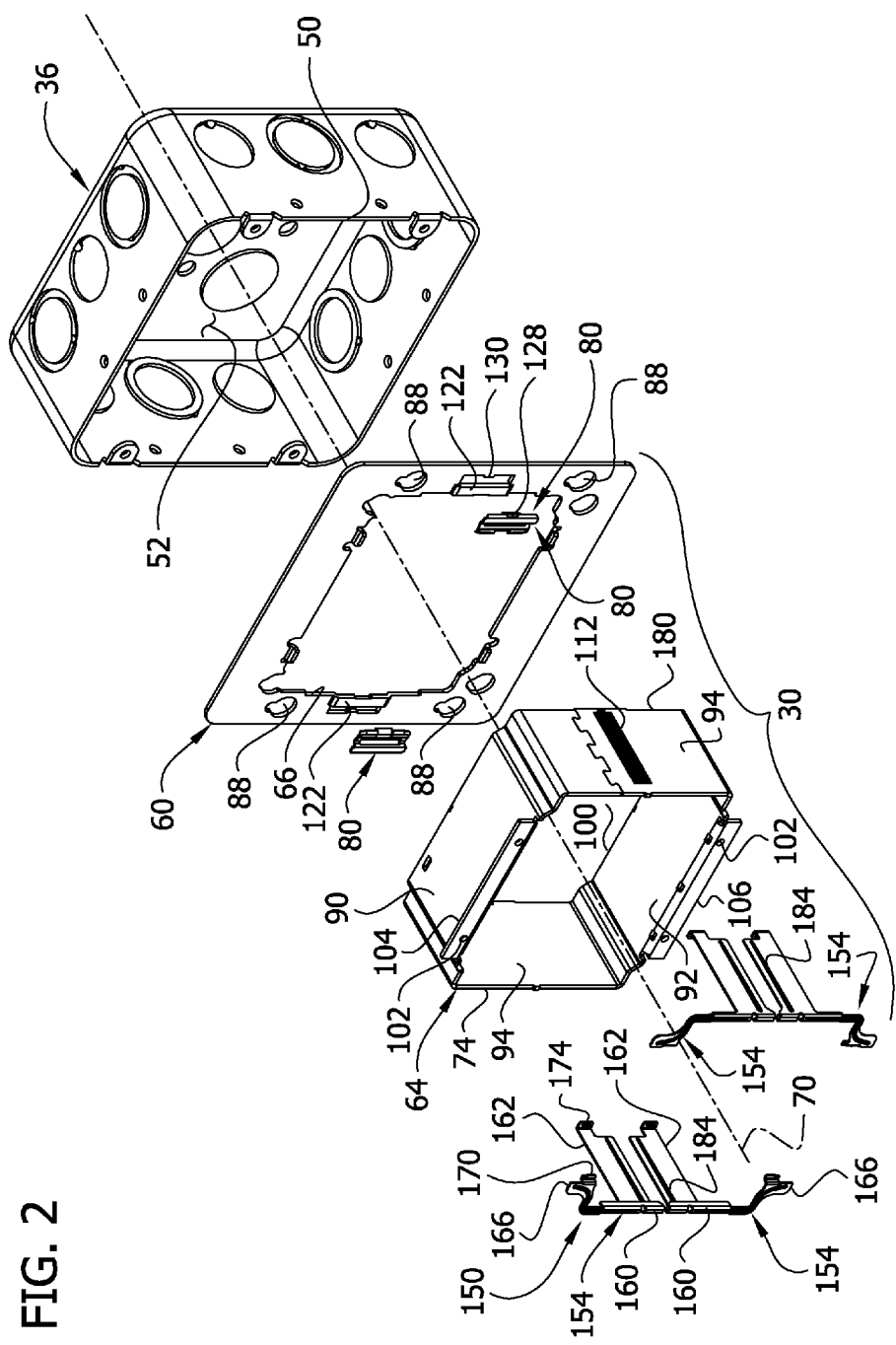
FIG. 2 is an exploded perspective showing various components of the ring assembly of FIG. 1.
Figure 3:
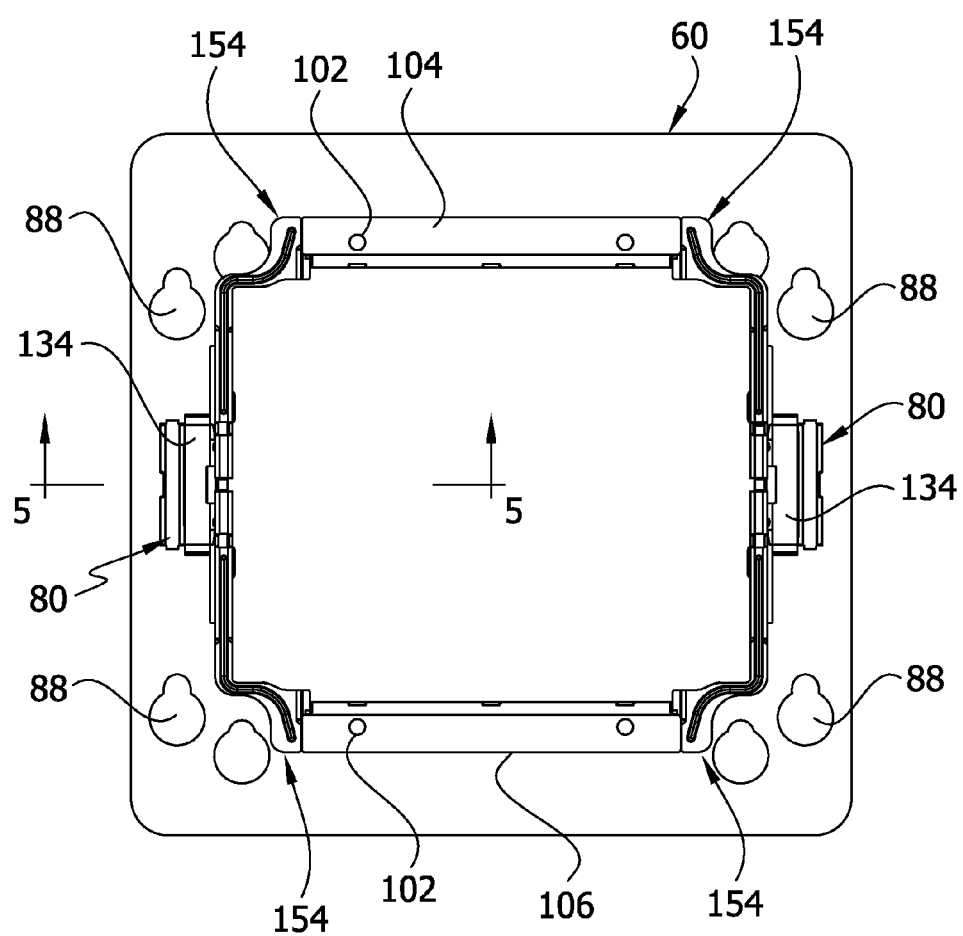
FIG. 3 is a front view of the ring assembly.
Figure 4:
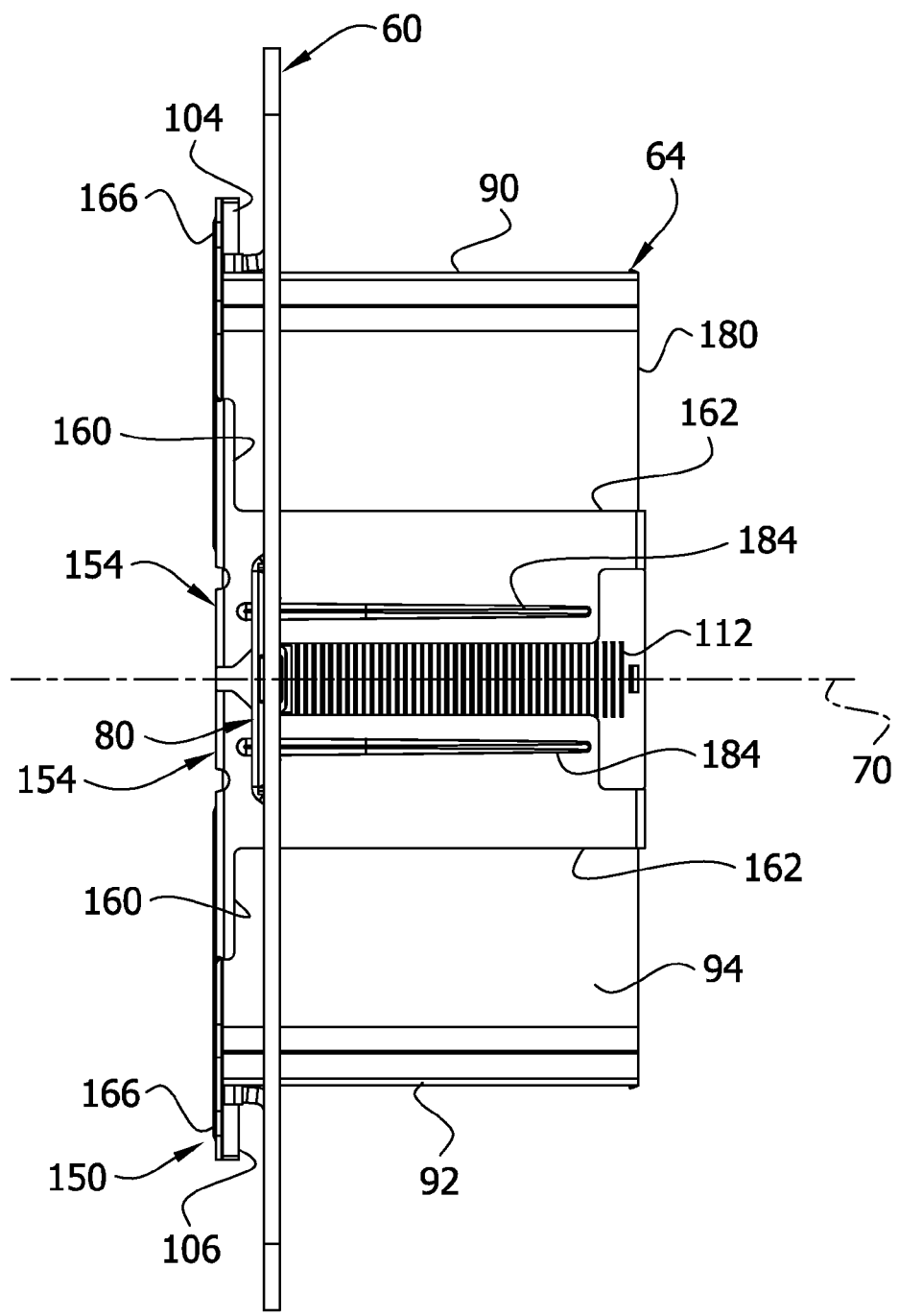
FIG. 4 is a side view of the ring assembly.
Figure 5:
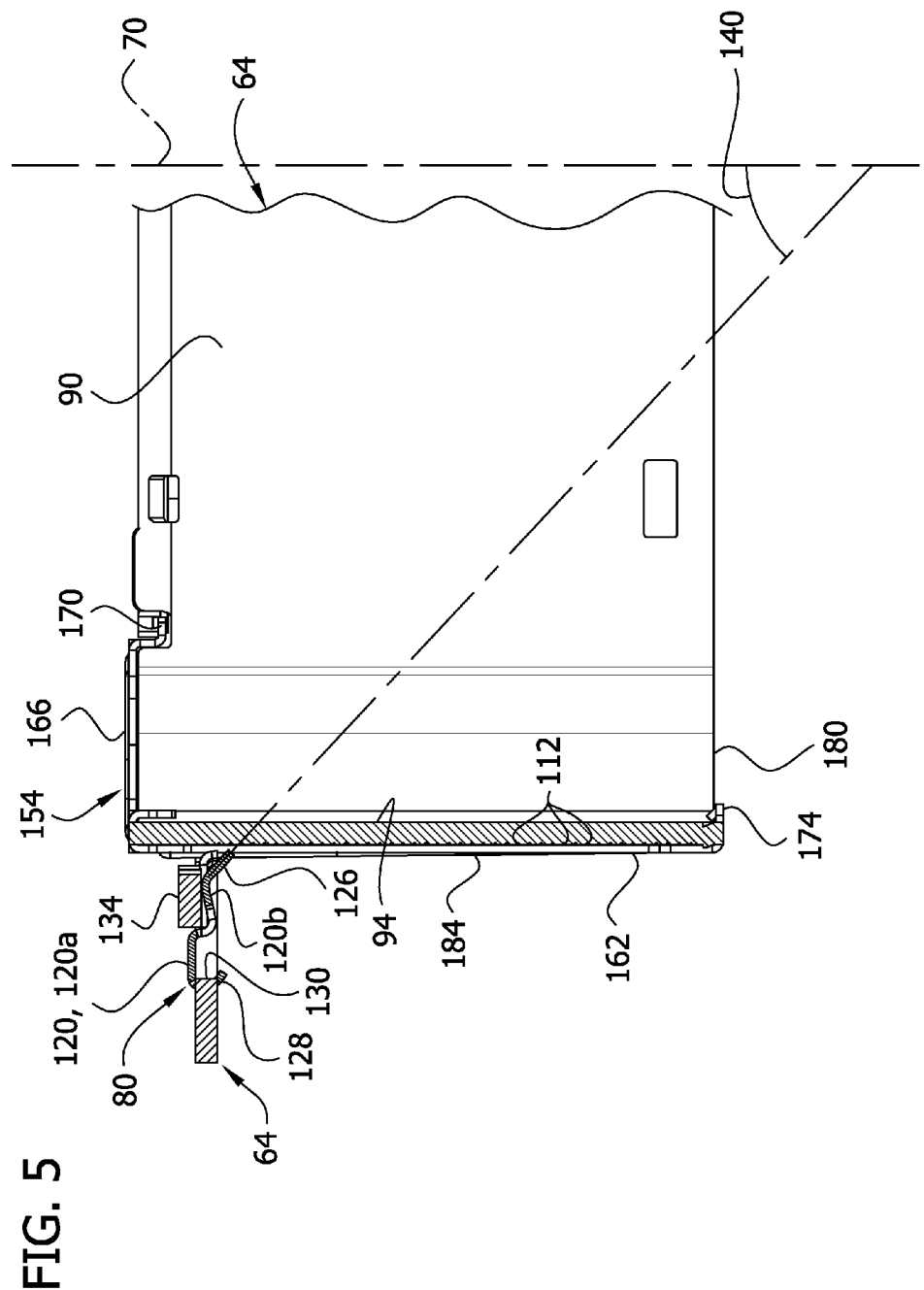
FIG. 5 is a section taken in the plane of lines 5-5 of FIG. 3.
Figure 6:
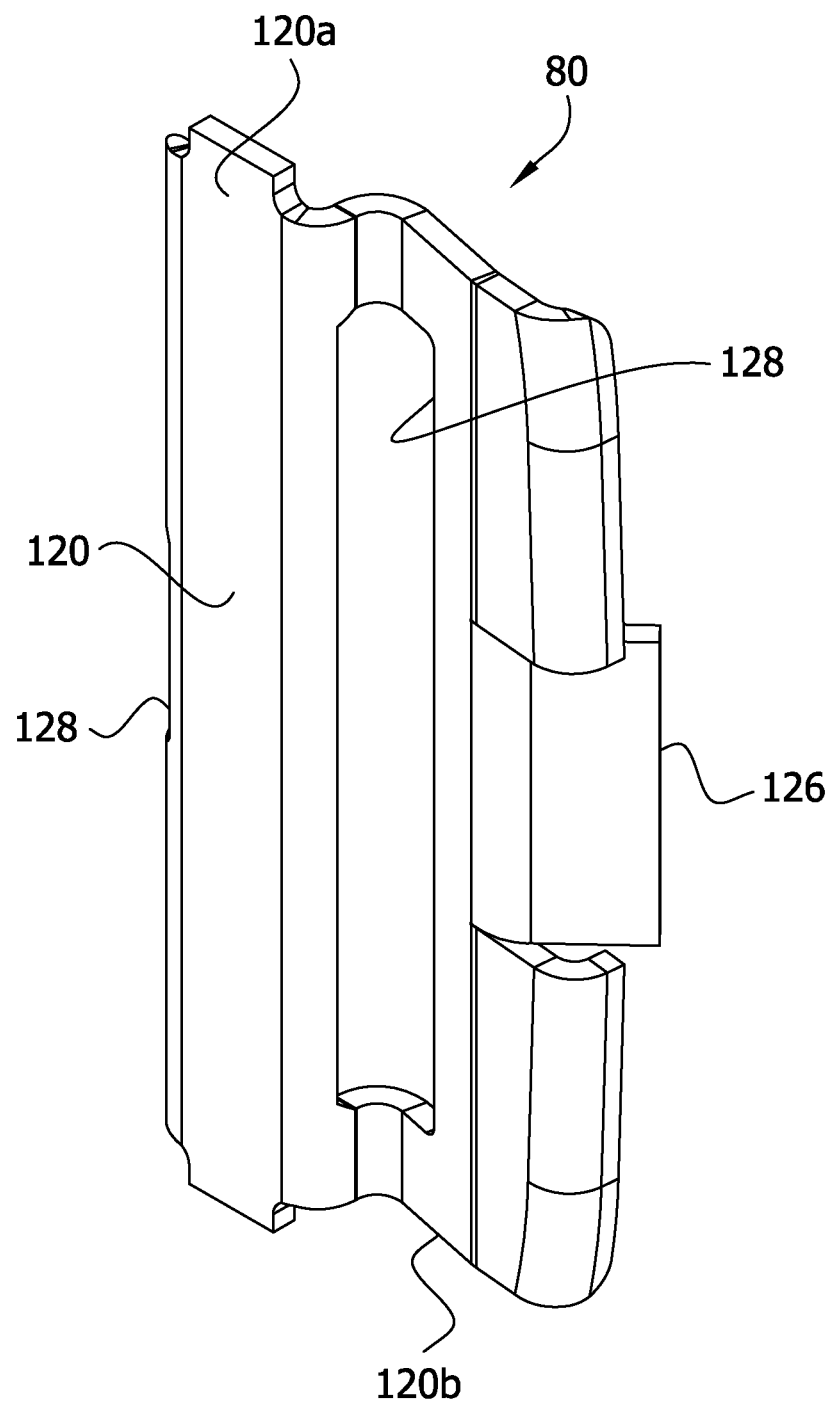
FIG. 6 is a perspective of a spring detent of the ring assembly.
Figure 7:
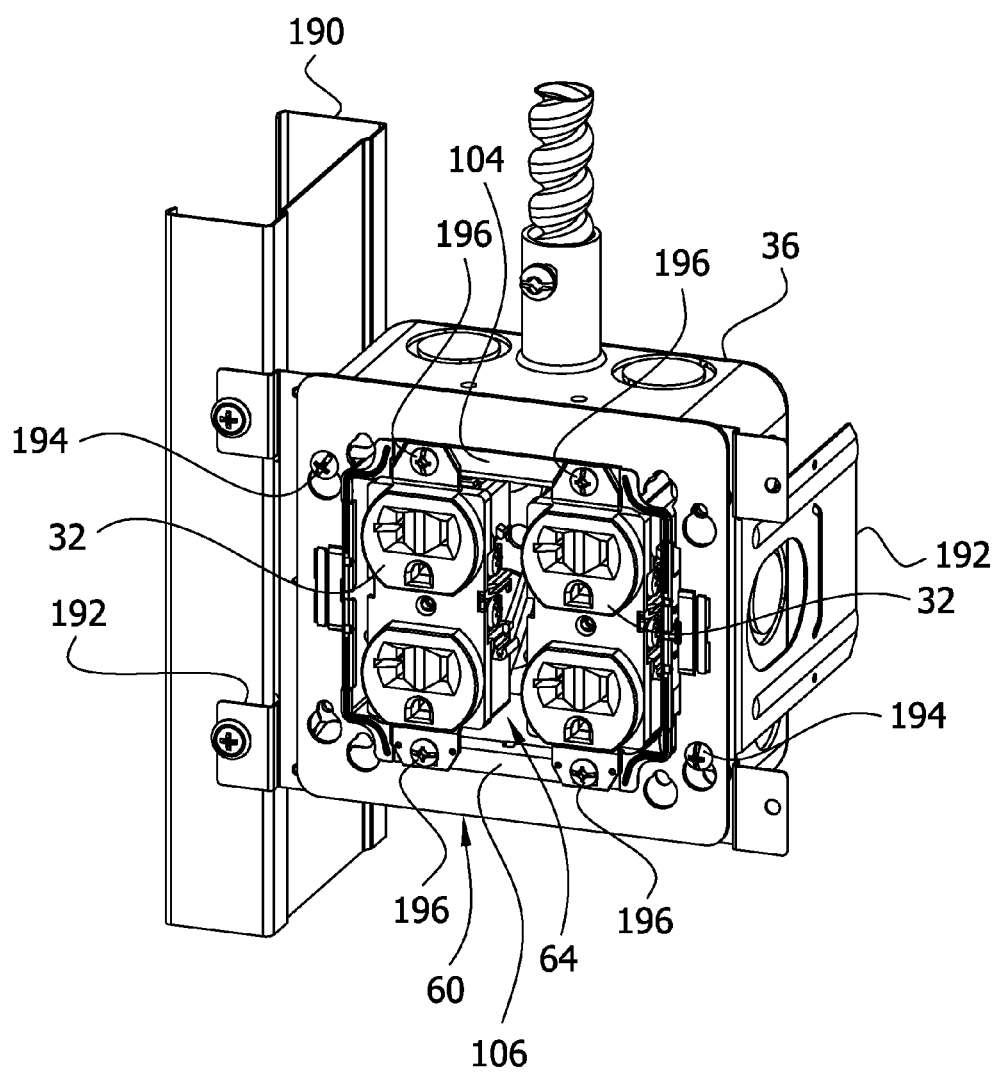
FIGS. 7-14 are views illustrating a method of installing the ring assembly in an electrical device.
Figure 8:
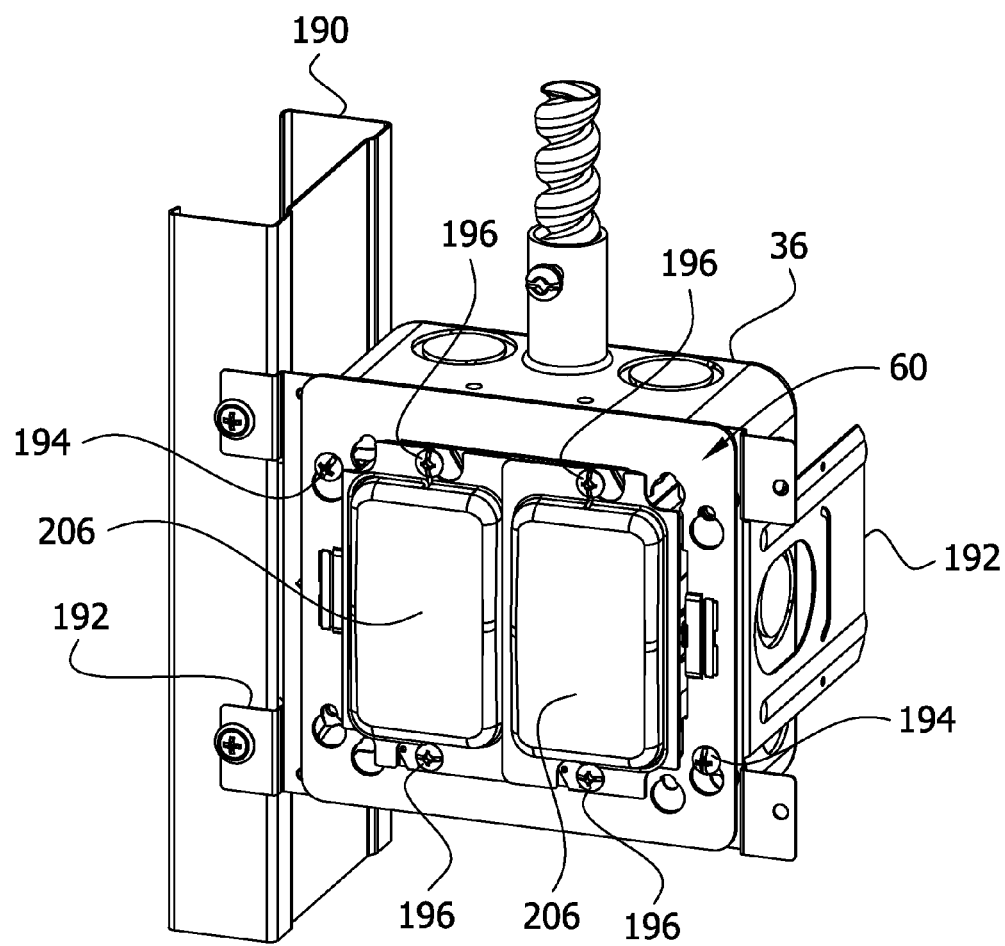

The spring detents 80 are mounted at opposite sides of the box cover plate 60 adjacent the central opening 66 in the plate. As illustrated in FIGS. 2-6, each detent 80 comprises a detent body 120 received in an opening 122 in the cover plate and a spring finger 126 on the detent body angled in a rearward direction for engagement with respective opposing side walls 94 of the extension ring 64. An opening 128 (FIG. 6) in the detent body 120 receives a tongue 130 on the box cover plate 60 to mount the detent on the cover plate. In its mounted position, the detent body 120 has a front part 120*a* that overlies the front face of the box cover plate 60 and a back part 120*b* that underlies a raised portion 134 of the cover plate (FIGS. 3 and 5). The spring finger 126 is struck from the back part 120*b* of the detent body and extends at an acute angle 140 relative to the axis of the cover plate (FIG. 5). This angle 140 can vary, e.g., in the range of 0-75 degrees, more desirably in the range of 30-60 degrees, and even more desirably in the range of 40-50 degrees. The detent 80 is of a suitable material. By way of example but not limitation, the detent can be of a material (e.g., heat treated spring steel) harder than the material of the extension ring 64 (e.g., galvanized steel) so that the spring finger 126 of the detent bites into the softer material of the extension ring to resist movement of the extension ring in a forward direction with respect to the ring, similar to the principle used in the well-known Chinese finger trap. The grooves 112 in the side walls 94 of the extension ring 64 are positioned for receiving the spring fingers 126 to increase such resistance.

Other spring detent configurations are possible. By way of example but not limitation, the spring detents 80 could be located on the extension ring 64 and be configured for engagement with surfaces of the box cover plate 60. Desirably, the detents 80 are at generally opposing locations to provide greater stability of the extension ring 64 in the box cover plate 60 and to prevent binding during axial movement of the extension ring relative to the cover plate. For example, the detents can be located on opposite sides of the box cover plate, or on the top and bottom of the plate, or diagonally opposite one another, although they need not be directly opposite one another. For example, they could be vertically or horizontally offset from one another.

The ring assembly 30 also includes an abutment device 150 on the extension ring 64 movable from a non-abutting position (FIGS. 1, 3, and 11) in which the device generally does not project outward beyond a perimeter of the extension ring to an abutting position (FIGS. 12 and 13) projecting outward beyond the perimeter of the ring, as viewed from the front of the ring, for abutting the front surface 84 of the wall member 42 when the extension ring 64 is moved to its installed position (FIG. 13). In the illustrated embodiment, the "perimeter" of the extension ring 64 includes the front edge or rim 74 of the ring and the upper and lower flanges 102, 104 of the ring. However, the perimeter of the ring may have other configurations.

The abutment device 150 comprises four discrete slide members 154, namely, upper and lower left slide members 154 mounted on the left side wall 94 of the extension ring 64 and upper and lower right slide members 154 mounted on the right side wall 94 of the extension ring. Each slide member 154 comprises a front element 160 having a channel-shaped cross section receiving a corresponding front edge portion 74 of the extension ring 64, a leg element 162 extending rearward from the front element along an outside surface of a corresponding side wall 94 of the extension ring, and an L-shaped abutment element 166 attached to the front element and projecting generally vertically (up or down) from the front element. The front elements 160 have a friction sliding fit with the front rim 74 of the extension ring 64 such that the slide members 154 are able to slide in a plane generally parallel to the plane defined by the front edge 74 or face of the extension ring from the aforementioned non-abutting position shown in FIGS. 1, 3 and 11, for example, in which the tips of the left and right upper abutment elements 166 are generally flush with the top edge of the upper flange 104 and the tips of the left and right lower abutment elements 166 are generally flush with the bottom edge of the lower flange 106. The slide members 154 are slidable to the aforementioned abutting position in which the abutment elements 166 of the upper slide members project up beyond the upper flange 104 of the extension ring for abutment with the front surface 84 of the wall member 42 when the extension ring is pushed in a rearward direction, and in which the abutment elements 166 of the lower slide members 154 project down beyond the lower flange 106 of the extension ring for abutment with the front surface of the wall member when the extension ring is pushed in a rearward direction. The back faces of the abutment elements 166 of the four slide members 155 are generally co-planar with one another and with the front of the extension ring 64. Each slide member 154 is held in assembly with the extension ring by a tab 170 on the abutment element 166 that contacts a back surface of a respective flange 104, 106, and a tab 174 on the leg element 162 which contacts the back surface or rim 180 of the extension ring (FIG. 5). The slide members 154 are of suitable material, such as heat treated spring steel.

The slide members 154 and spring detents 80 are configured such that the detents are operable to allow the extension ring 64 to be pushed in either a rearward direction or a forward direction relative to the box cover plate 60 when the slide members are in their non-abutting position. On the other hand, the slide members 154 and spring detents 80 are configured such that the detents are operable to resist movement of the extension ring 64 in a forward direction relative to the box cover plate 60 when the slide members are in their abutting position. In particular, as best illustrated in FIGS. 3 and 5, when the left slide members 154 are in their non-abutting position, the body 120 of the left detent 80 contacts the leg elements 162 of the two left slide members and is held in a resiliently flexed condition in which the spring finger 126 of the detent is out of engagement with the left side wall 94 of the extension ring 64. Similarly, when the right slide members 154 are in their non-abutting position, the body 120 of the right detent 80 contacts the leg elements 162 of the right slide members and is held in a resiliently flexed condition in which the spring finger 126 of the detent is out of engagement with the right side wall 94 of the extension ring. With the spring fingers 126 of the two detents 80 out of engagement with respective walls of the extension ring 64, the extension ring can be moved freely in both forward and rearward axial directions. However, when the slide members 154 are moved to their respective abutting positions (as during the final stages of the installation process to be described later), the bodies 120 of the detents 80 move out of engagement with the leg elements 162, which allows the detents to move resiliently inward to positions in which the spring fingers 126 are resiliently biased against respective side walls 94 of the extension ring. When the spring fingers are in this position, they allow movement of the extension ring 64 in a rearward direction relative to the box cover plate 60 but resist movement of the extension ring in a forward direction relative to the plate.

The leg elements 162 of the slide members 154 have tapering ribs forming ramps 184 extending along the lengths of the leg elements, and the heights of these ramps decrease in front-to-back direction (see FIG. 5). The ramps 184 are positioned for engagement by the back parts 120b of the detent bodies 120 when the slide members 154 are in their non-abutting positions. The ramps 184 on the slide members 154 and the grooves 112 in the extension ring 64 allow the mating parts to be made with larger dimensional tolerances.

Other abutment devices movable between abutting and non-abutting positions are possible, including embodiments where there is no interaction between the detents and the abutment device.

Figure 9:
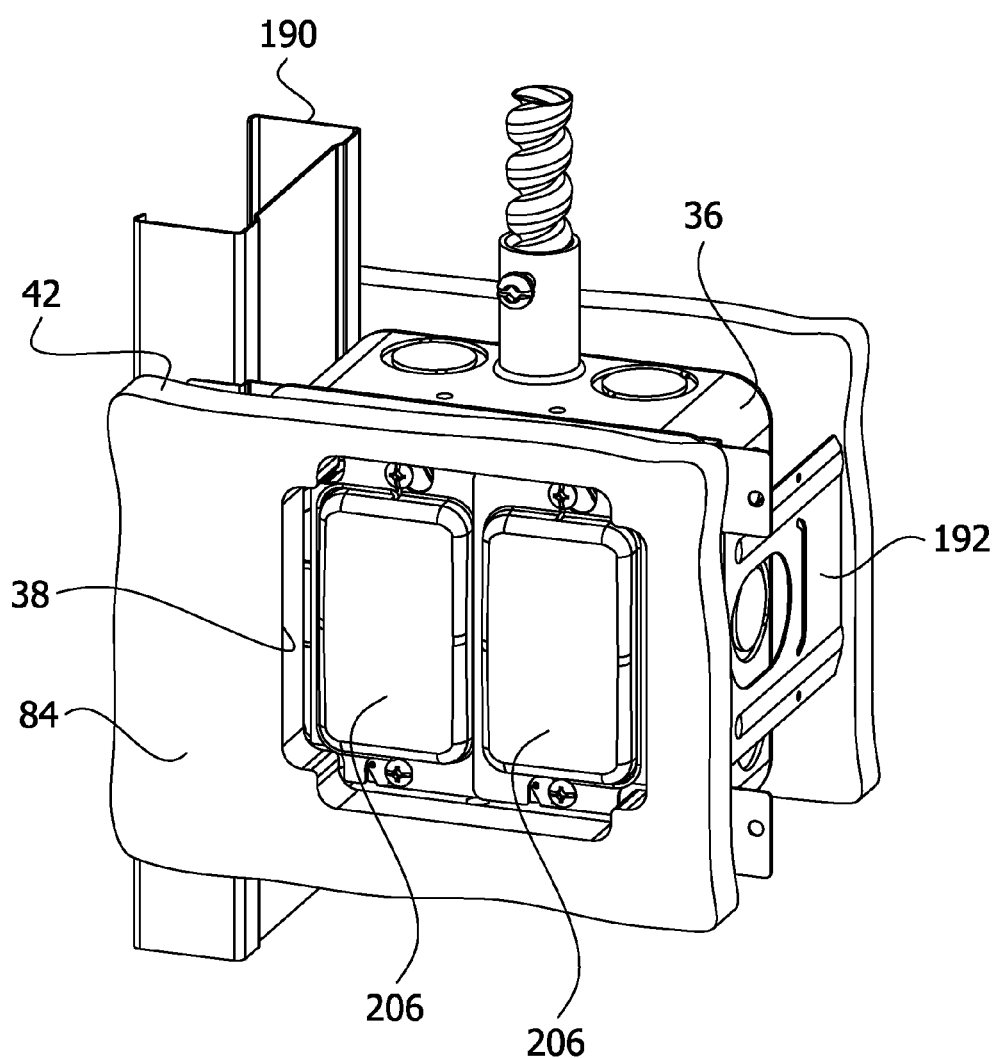
Figure 10:
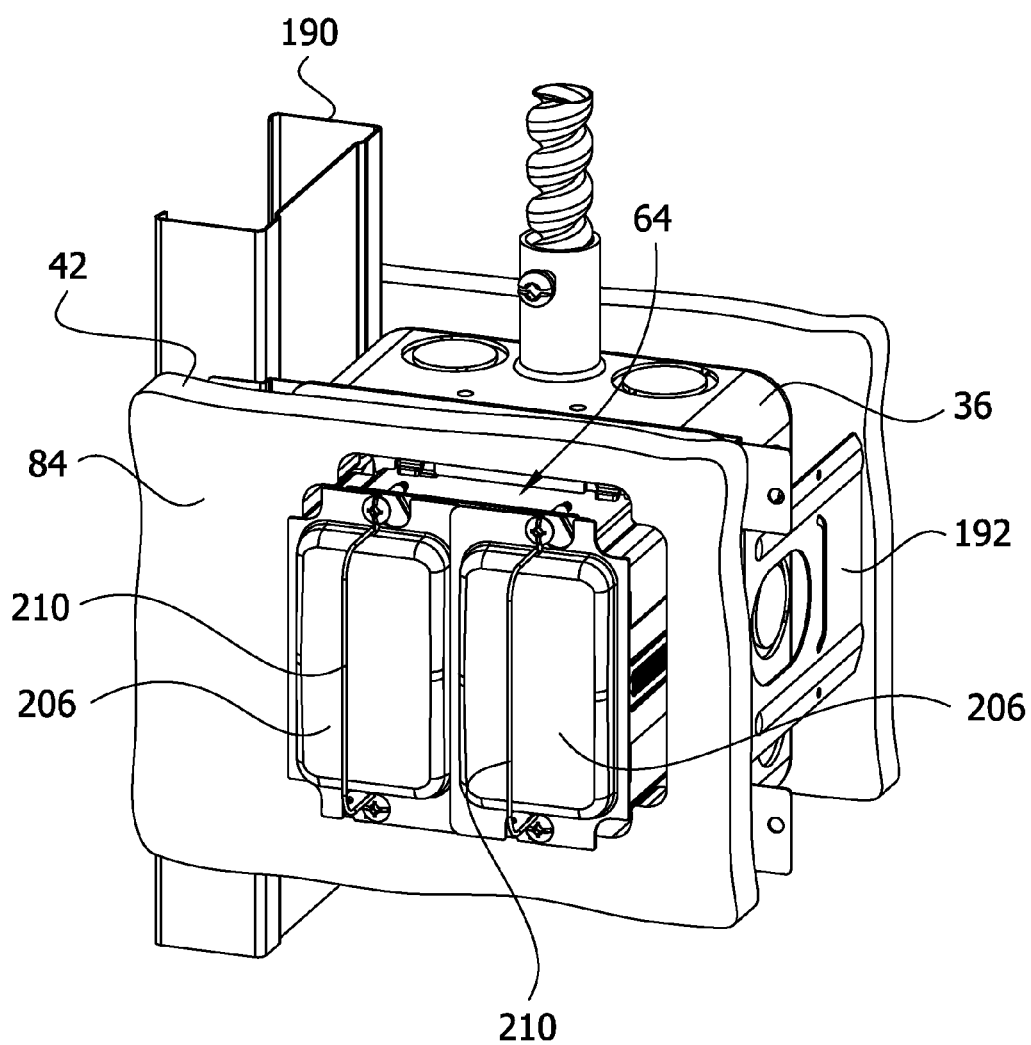
Figure 11:
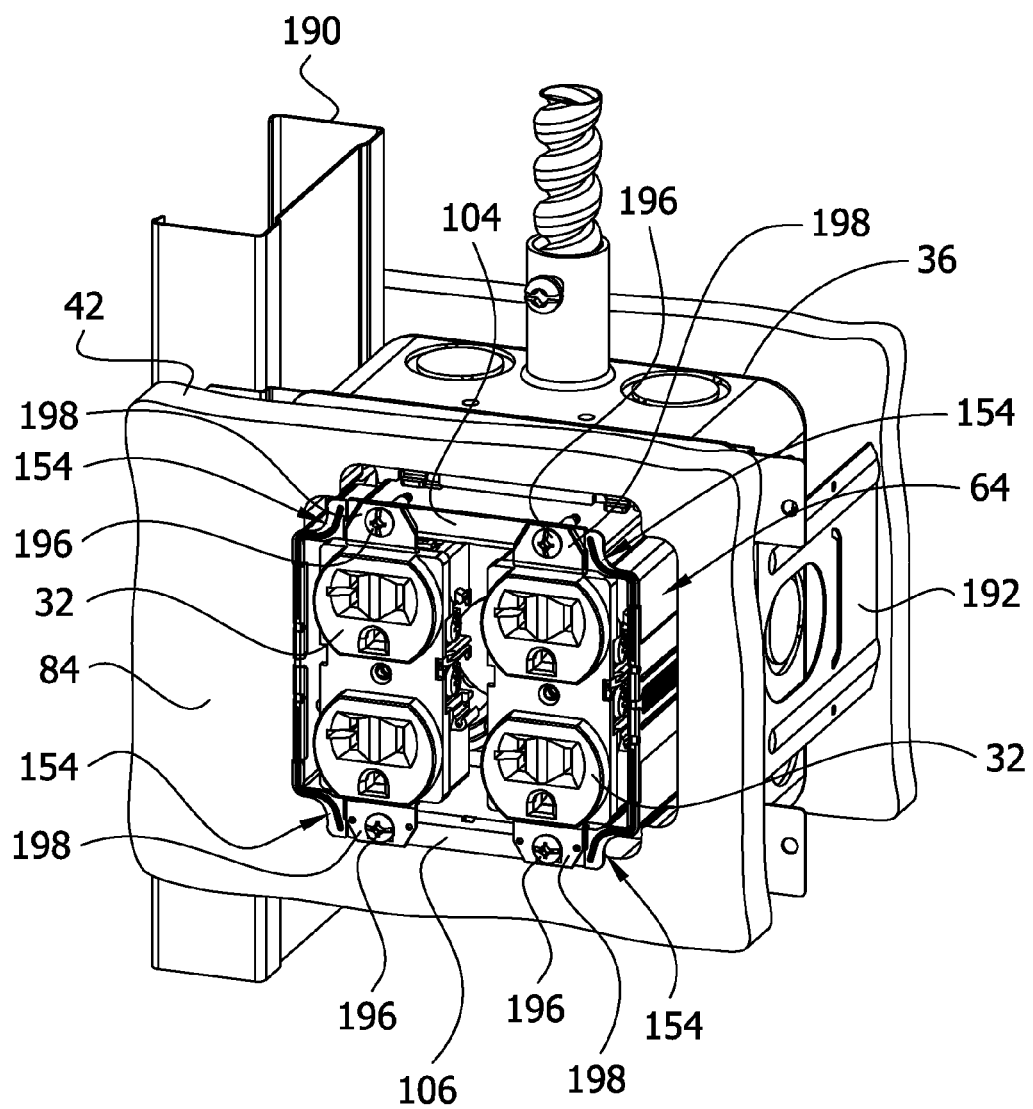
Figure 12:
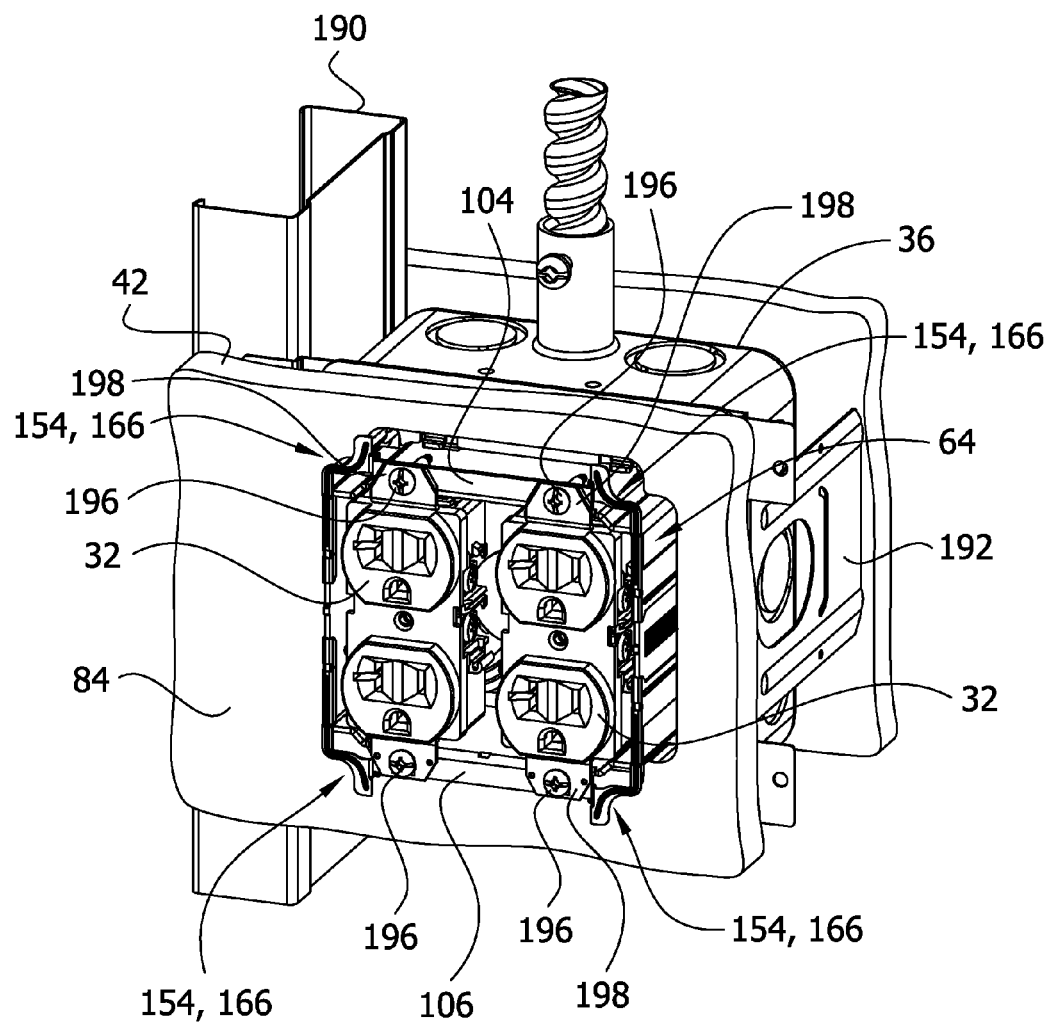

FIGS. 7-14 illustrate steps in a method of installing the assembly 30 in an electrical box 36. To begin the process (FIG. 7), the electrical box 36 is mounted in position on a frame 190, typically a wood or metal stud, using a box-mounting bracket 192 or other device. The box 36 is wired, and the box cover plate 60 is secured to the front of the electrical box using suitable fasteners 194 extending through fastener openings 88 in the plate into fastener openings in the box, such that the central opening 66 in the plate is in registration with the opening 50 at the front of the box. One or more electrical devices 32 are mounted side-by-side in the cavity 100 defined by the extension ring 64 and secured to the ring using suitable threaded fasteners 196 extending through fastener openings in tabs 198 of the electrical device(s) and through aligned fastener openings 102 in the flanges 104, 106 of the extension ring. The wiring of the electrical device(s) 32 is connected to the wiring in the junction box 36. Then, with the abutment device 150 on the extension ring 64 in its non-abutting position, the extension ring is pushed in the opening 66 of the box cover plate 60 in a rearward direction to a position in which the flanges 104, 106 of the extension ring are closely adjacent the front surface of the box cover plate. One or more temporary covers 206 (FIG. 8) are attached by suitable fasteners 196 to the electrical device(s) 32 and/or flanges 104, 106 of the extension ring 64 to cover the electrical device(s) prior to installation of the wall member 42 (FIG. 9).

Referring to FIG. 9, the wall member 42 is installed in front of the adjustable-depth ring assembly 30, and the opening 38 is cut in the wall member to provide access to the assembly. Using wire bails 210 pivoted on the covers, the extension ring 64 containing the electrical device(s) 32 is pulled out in a forward direction to a position in which the abutment device 150 is in front of the wall member 42 (FIG. 10); the temporary cover(s) is removed from the electrical device (FIG. 11); and the slide members 154 of the abutment device 150 are moved to their abutting positions in which the abutment elements 166 extend outward beyond the perimeter of the extension box 64 (FIG. 2). The movement of the slide members 154 to their abutting positions releases the spring detents 80 to move resiliently to positions in which the spring fingers 126 engage respective walls 94 of the extension ring 64. With the spring fingers 126 thus positioned, the extension ring 64 is pushed in a rearward direction until the abutment elements 166 contact the front surface of the wall member (FIG. 13). Desirably, the spring fingers 126 make a "clicking" noise as they move over the grooves 112 in the extension ring 64. A final push or "click" tightens the abutment elements 166 against the wall member 42, thus assuring the installer that the front 74 of the extension ring 64 is generally flush (i.e., co-planar) with the front surface 84 of the wall member and that the electrical devices 32 are properly positioned substantially flush with the outer surface of the wall member. As a final step (FIG. 14), a finish plate 220 is attached to the electrical device(s) 32, using suitable fasteners 222, to cover the electrical device(s) and the opening 38 in the wall member 42.

Unlike conventional methods, the above installation process is quick and easy, and the assembly 30 is easily adjustable to accommodate walls of virtually any thickness within a desired range (e.g., ⅝ in. to 1¼ in.). Also, there is no need to use adjustment screws, which makes the process more convenient and less time-consuming.

Figure 15:
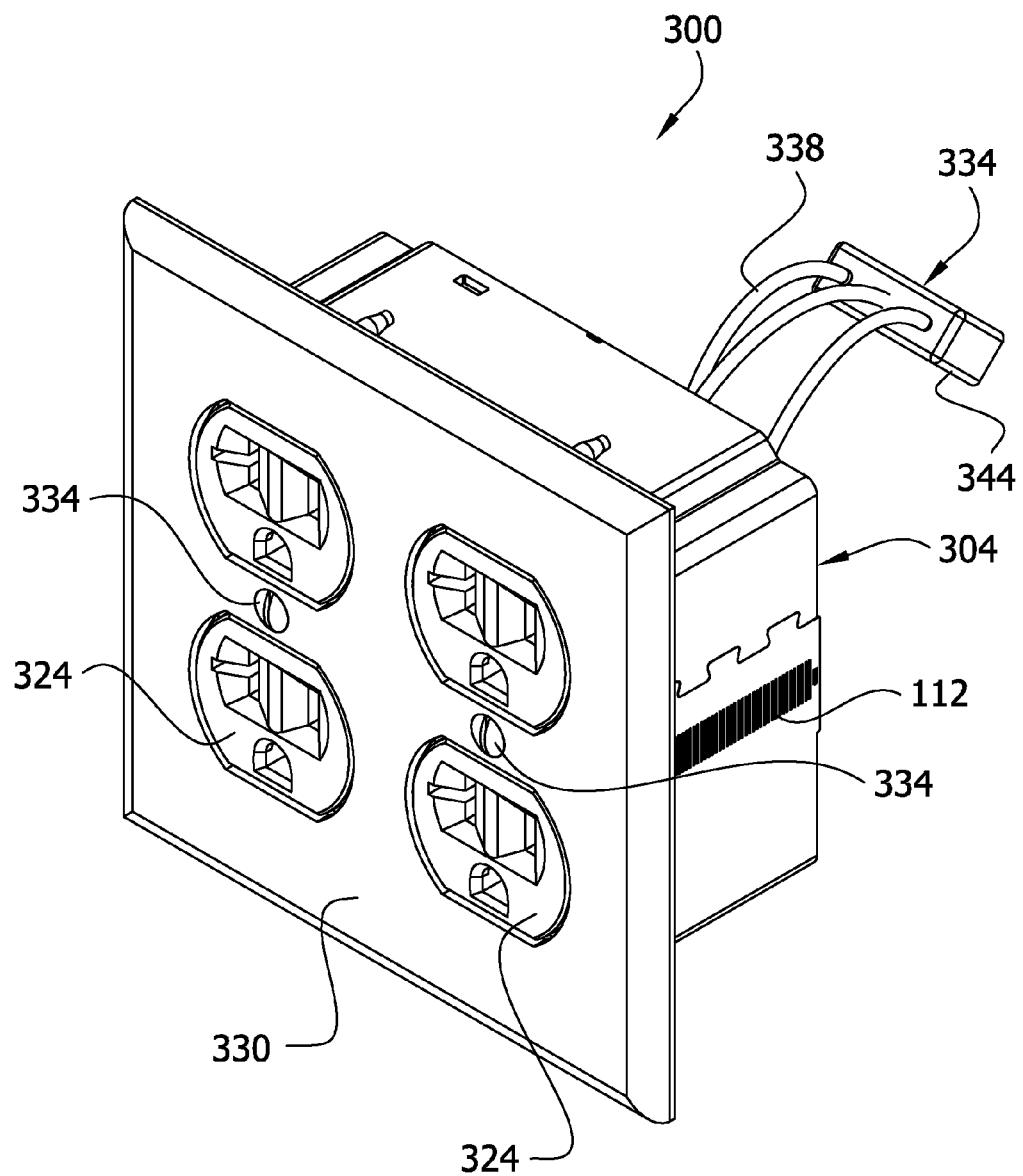
FIG. 15 is a perspective of a second embodiment of an adjustable-depth ring assembly of this invention.
Figure 16:
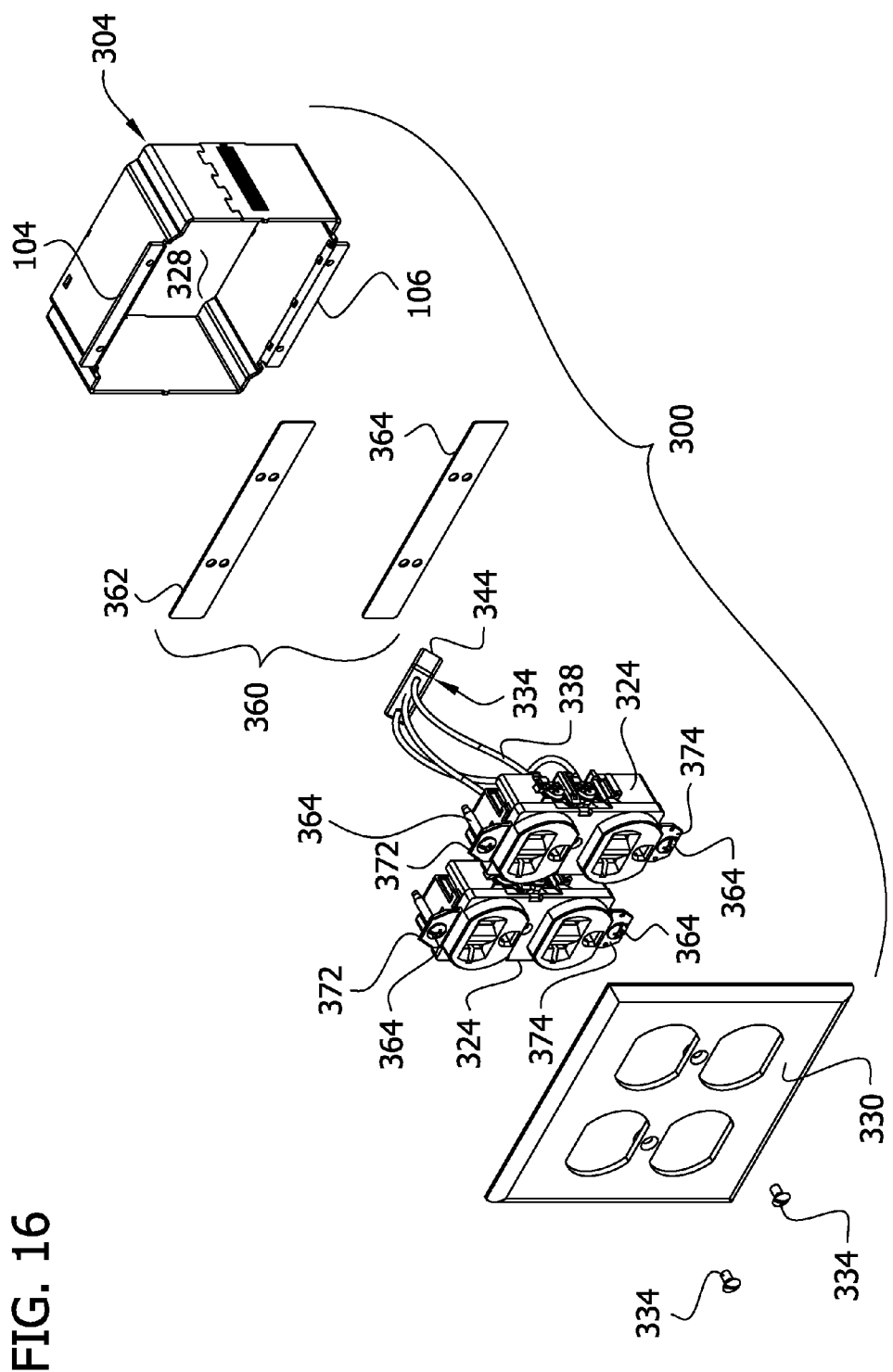
FIG. 16 is an exploded perspective showing various components of the ring assembly of FIG. 15.

FIGS. 15 and 16 illustrate a second embodiment of an adjustable-depth ring assembly of this invention, generally designated 300. In general, the assembly 300 comprises (i) an extension ring 304 sized for reception in a central opening 306 of a box cover plate 310 (FIG. 17) attached to an electrical box 320, (ii) an electrical device or devices 324 received in a cavity 328 defined by the extension ring, and (iii) a finish cover plate 330 attached by suitable fasteners 334 to the electrical device(s) at a location in front of the extension ring. The extension ring 304, electrical device(s) 324 and finish cover plate 330 are fastened together to form a pre-assembled unit (also designated by the reference number 300). The unit is free of any connection with the box cover plate 310 and electrical box 320 prior to field installation, as will be described. The parts of the pre-assembled unit 300 will typically (but not necessarily) be assembled at a location remote from the job site, desirably at a time only shortly before the unit is needed to complete an installation at the job site, thus minimizing the lead time required to purchase and stock the parts. The short lead time is also beneficial because any last-minute design changes requiring different parts can be taken into account when making the pre-assembled unit 300.

Figure 17:
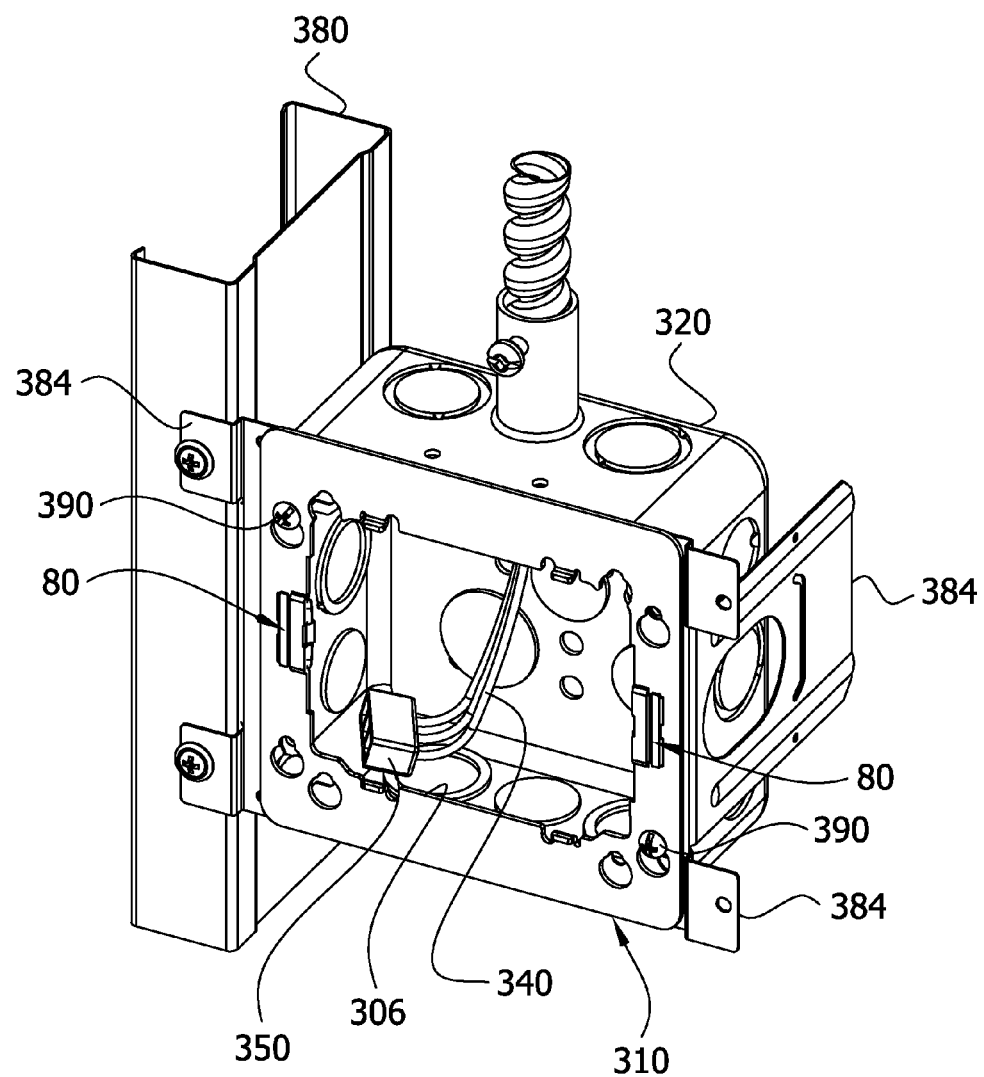
FIG. 17 is a perspective of an electrical box mounted on a frame, and a box cover plate secured to the box prior to installation of the adjustable-depth ring assembly of FIG. 15.
Figure 18:
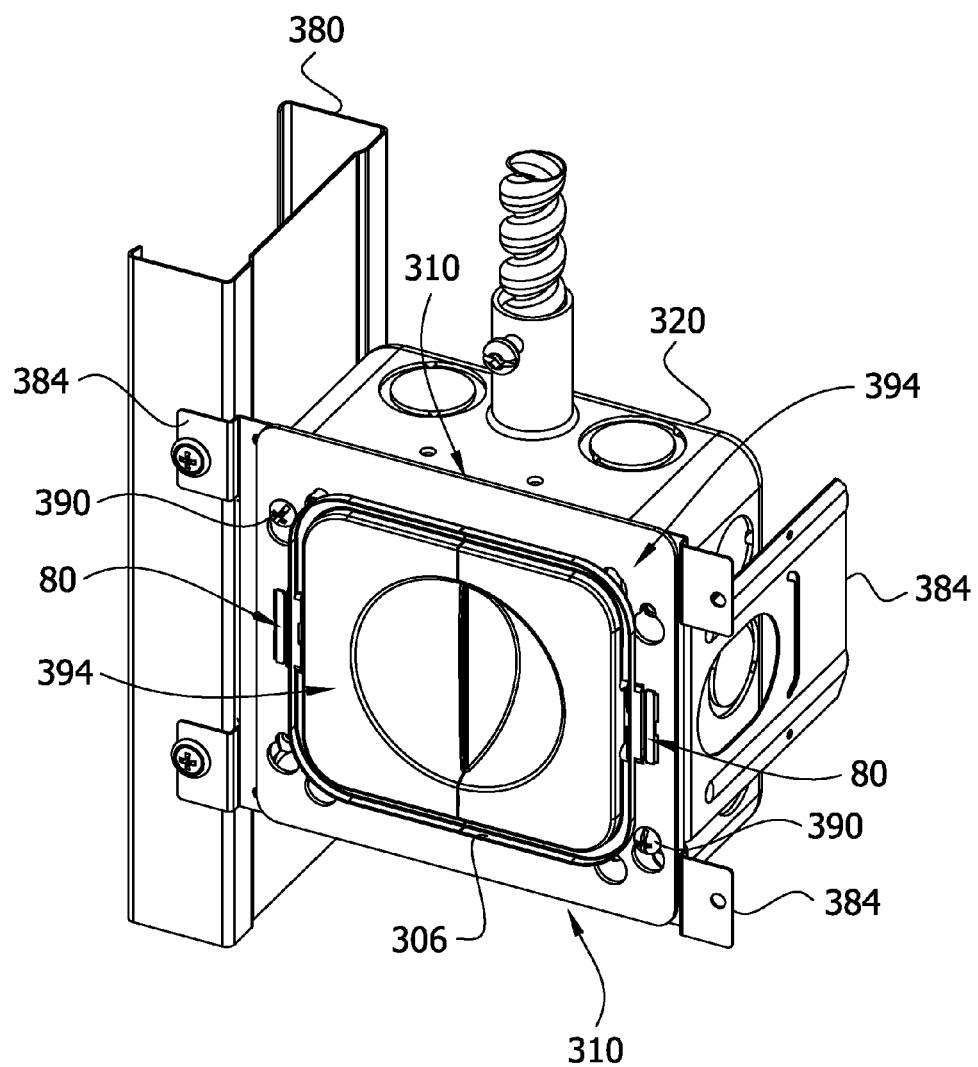
FIG. 18 is a view similar to FIG. 17 but showing a temporary cover mounted on the box cover plate prior to installation of a wall member in front of the plate.
Figure 19:
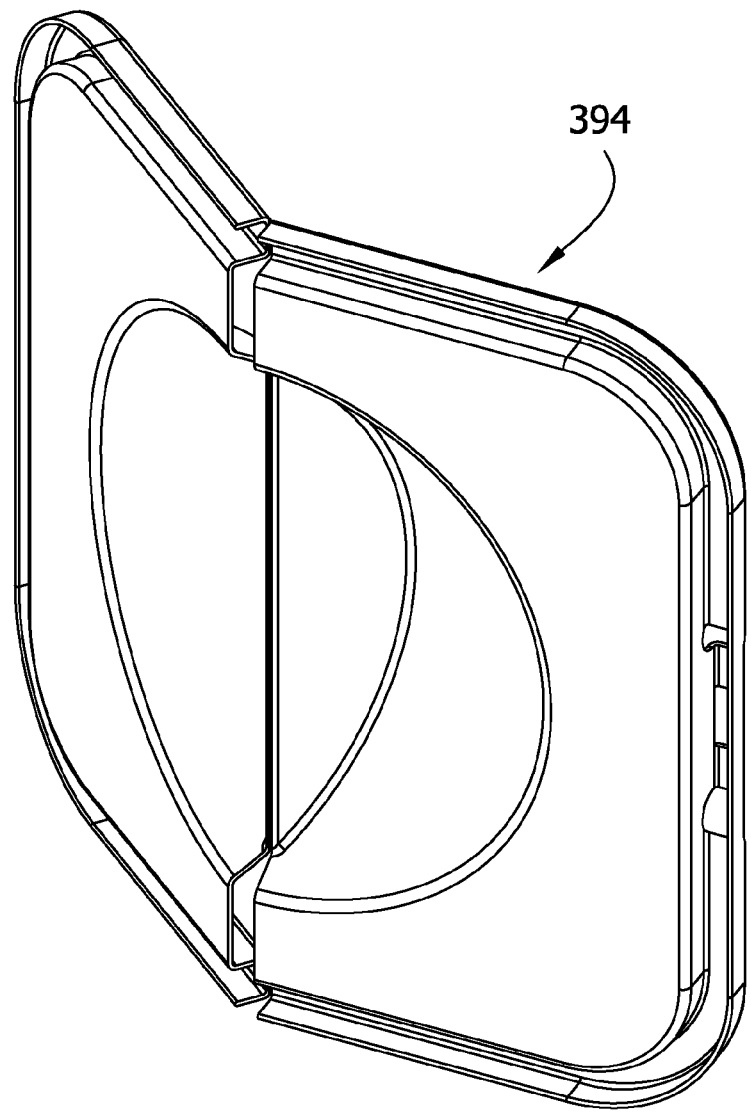
FIG. 19 is a perspective of the temporary cover.
Figure 20:
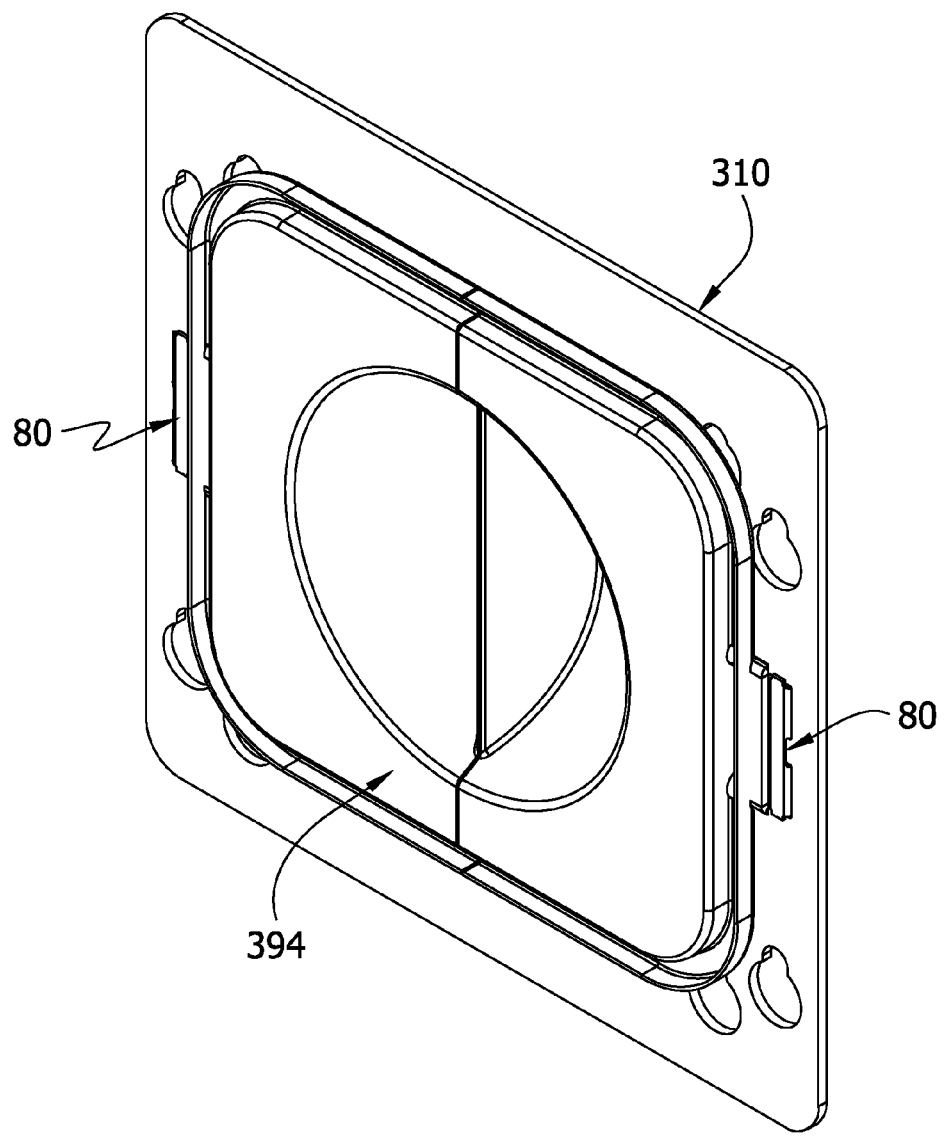
FIG. 20 is a perspective of the temporary cover in assembly with the box cover plate.
Figure 22:
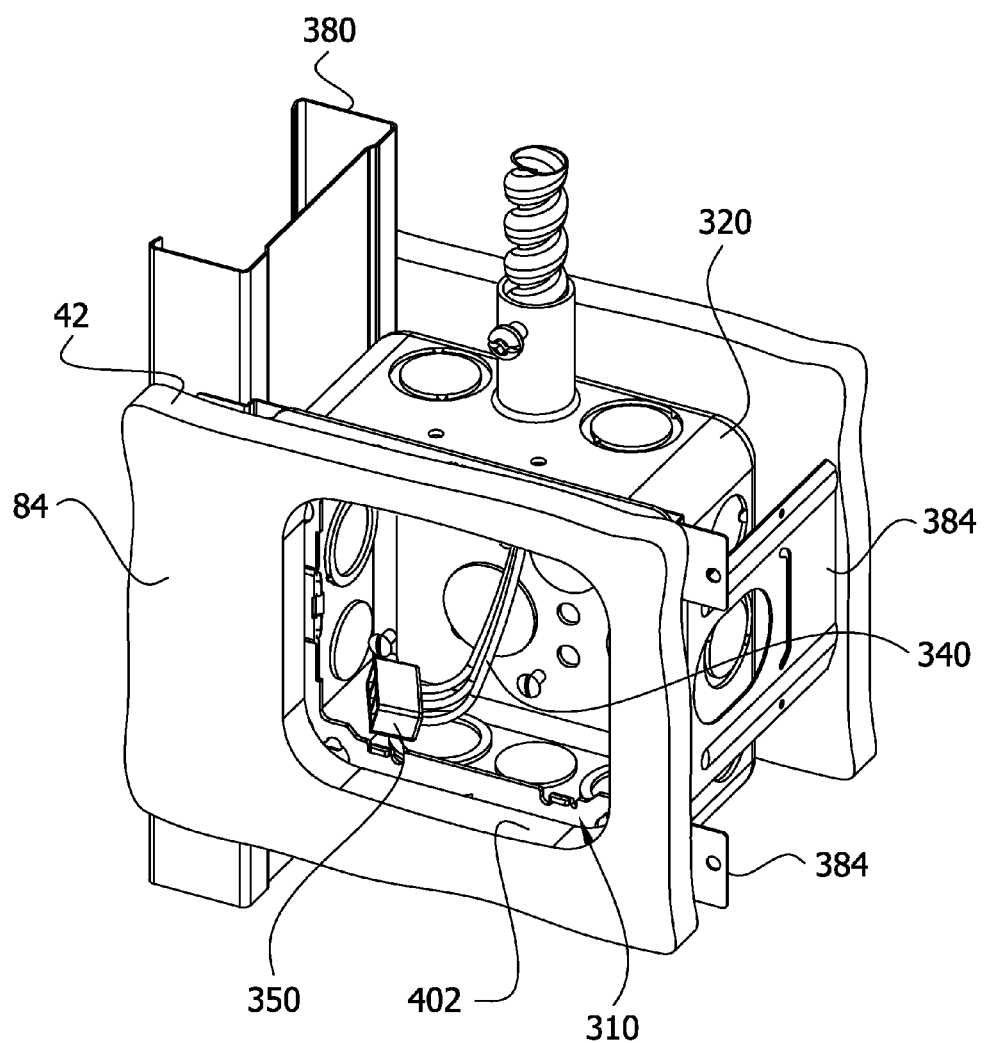
Figure 23:
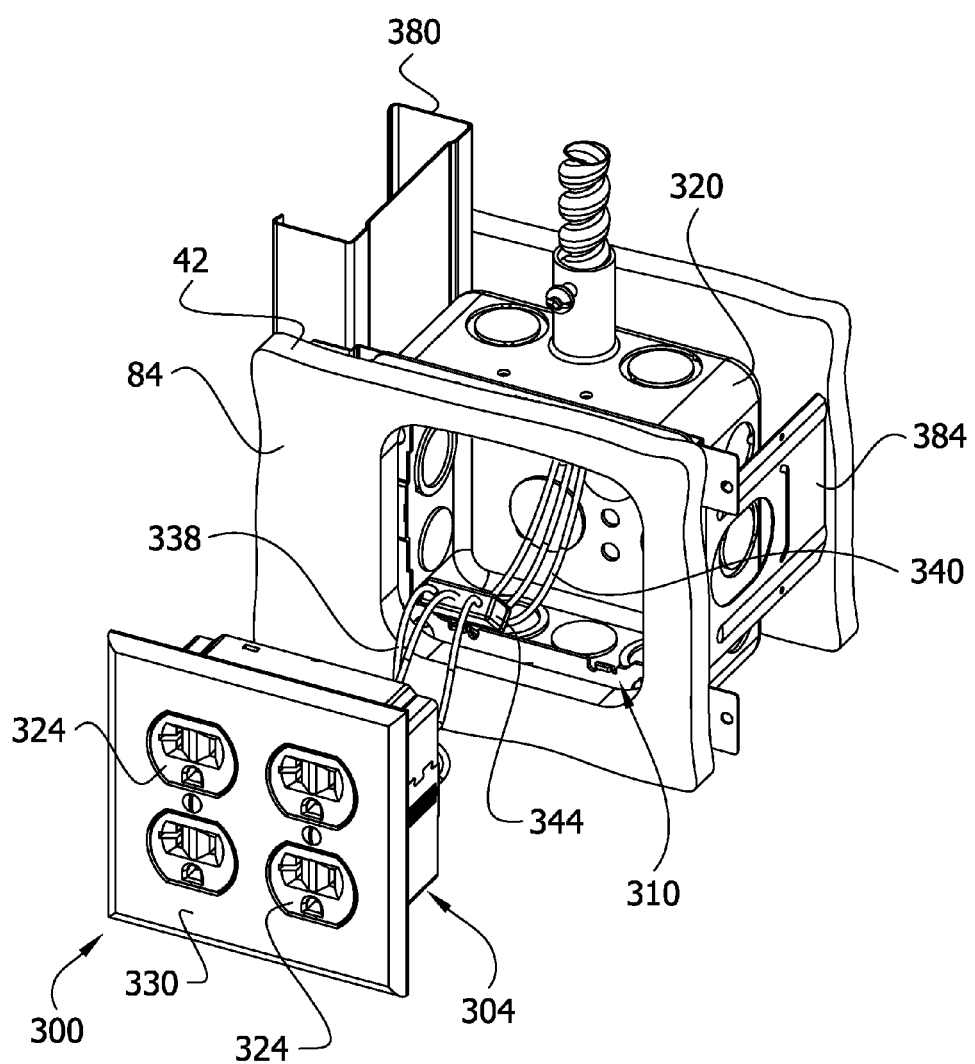

The box cover plate 310, extension ring 304, and finish cover plate 330 are the same as described in the first embodiment and corresponding component parts are identified by corresponding reference numbers. Each electrical device 324 has a quick connector 334 for connecting the wiring 338 of the device to corresponding wiring 340 in the electrical box 320 (FIGS. 17 and 22). In one embodiment, the quick connector 334 comprises a first plug component 344 provided as part of the electrical device 324. This plug component 344 is configured to mate with a second plug component 350 provided as part of the wiring 340 in the box 320. Other types of quick connectors are possible.

The abutment device in this embodiment, generally indicated at 360, is different from the abutment device 150 of the first embodiment. Abutment device 360 comprises upper and lower abutment plates 362, 364 secured by suitable fasteners 364 to respective upper and lower flanges 104, 106 on the extension ring 304. The abutment plates 362, 364 are fixed, not movable as in the first embodiment. In other embodiments, the abutment plates are eliminated, and upper and lower tabs 372, 374 on the electrical device(s) 324 serve as the abutment device for abutting the front surface 84 of the wall member 42 during the final stage of the installation process described below.

Figure 21:
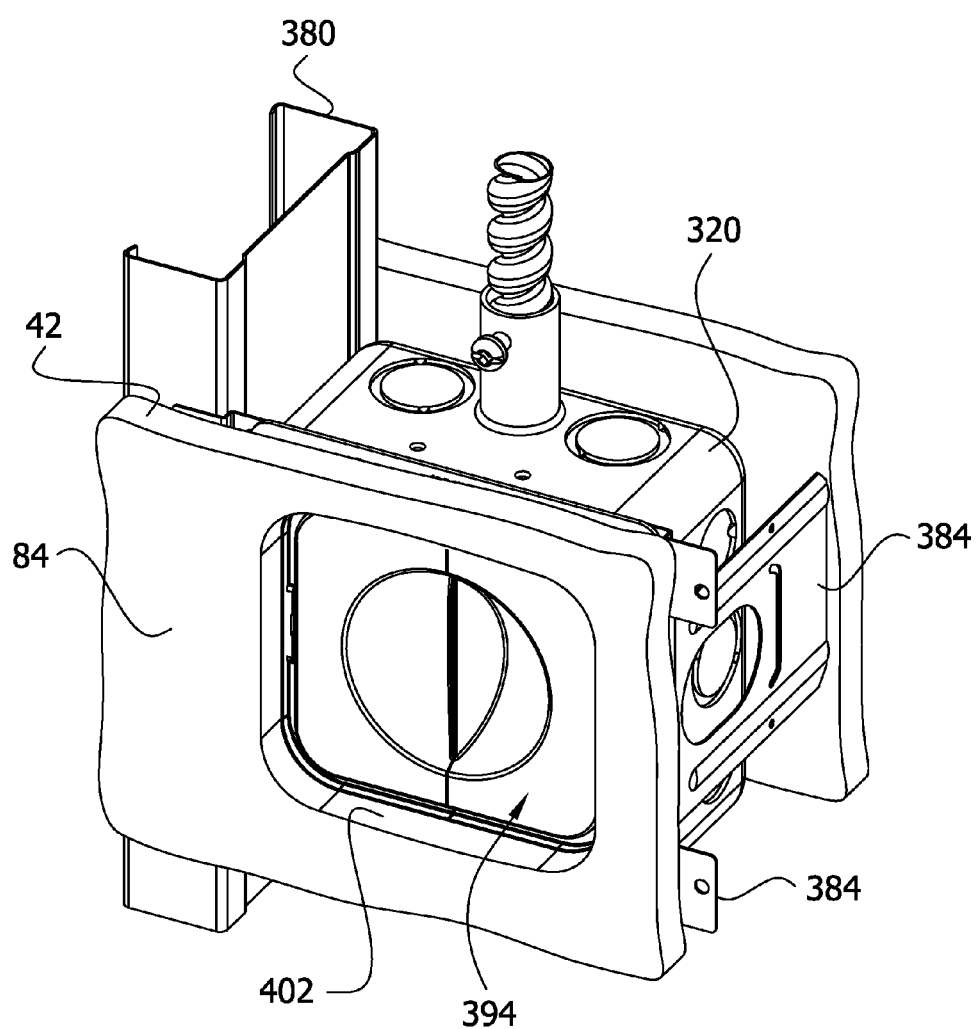
FIGS. 21 to 24 are views illustrating a method of installing the ring assembly of FIG. 15 as a pre-assembled unit with the box cover plate and electrical box of FIG. 17.

FIGS. 17-24 illustrate a method of installing the pre-assembled unit 300 in an electrical box 320. As in the first embodiment, the electrical box 320 is mounted in position on a frame 380, typically a wood or metal stud, using a box-mounting bracket 384 or other device (FIG. 17). The box 320 is wired, and the box cover plate 310 is secured to the front of the electrical box using suitable fasteners 390 such that the central opening 306 in the plate is in registration with the opening at the front of the box 320. A snap-in temporary cover 394 is attached to the box cover plate 310 prior to installation of the wall member 42 (e.g., drywall) to cover the opening 306 in the plate (see FIG. 18). The wall member 42 (e.g., drywall) is installed in front of the plate 310 and cover 394, and an opening 402 is cut in the wall member to provide access to the assembly (FIG. 21).

The extension ring 304, electrical device(s) 324 and finish cover plate 330 are assembled to form the pre-assembled unit 300. This assembly is at a location which is typically remote from the job site. By way of example, the parts of the pre-assembled unit 300 may be assembled by the seller of the unit, or by a distributor that purchases the parts of the unit, or by a contractor or sub-contractor that is responsible for installing the units. Regardless, the parts are assembled by attaching the abutment plates 362, 364 to the extension ring 304 (if abutment plates are used), and by attaching the electrical device or devices 324 to the extension ring with the electrical device(s) received in the cavity 328 defined by the ring. The extension ring 304 is selected to have a size suitable for a close-fit reception in the central opening 306 in the box cover plate 310 to which it is to be later secured, as in the first embodiment. The finish cover plate 330 is attached to the electrical device(s) 324 at a location in front of the extension ring, as shown in FIG. 15. As thus assembled, the extension ring, electrical device(s) 324 and finish cover plate 330 form the pre-assembled unit 300, which is ready for installation in the field. Prior to such installation the unit is free of any connection to the box cover plate 310 and the electrical box 320.

Figure 24:
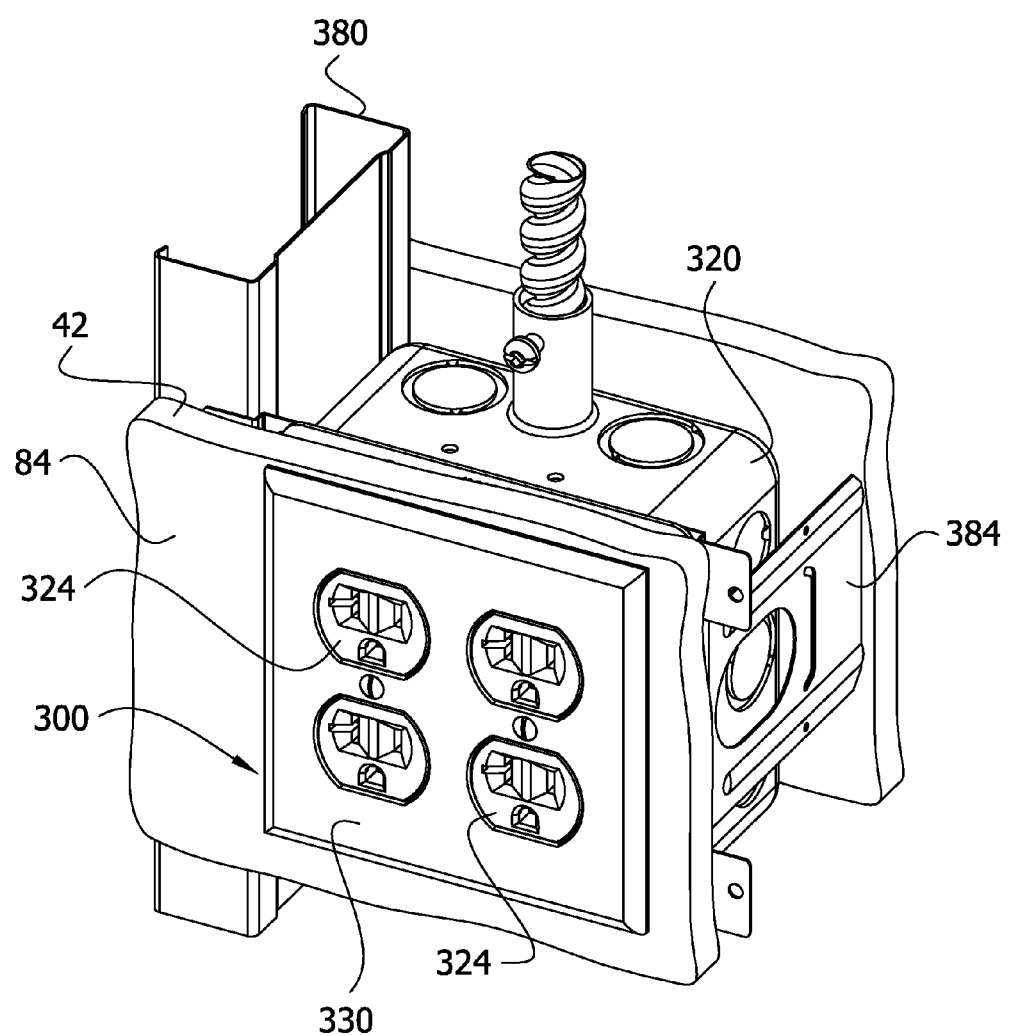

Field installation of the pre-assembled unit 300 is quick, easy and simple. A worker removes the temporary cover 394 (FIGS. 22 and 23) and connects the wiring 338 of the electrical device(s) 324 to the wiring 340 in the box 320, preferably using the quick connector plug components 344, 350. The pre-assembled unit 300 is then quick connected to the box cover plate 310 simply by pushing the extension ring 304 of the unit in a rearward direction into the central opening 306 of the box cover plate to an installed position in which the abutment plates 362, 364 (or tabs 372, 374 in the absence of the abutment plates) abut a front surface 84 of the wall member 42 and the finish cover plate 330 is generally flush with the front surface of the wall member (FIG. 24). As in the first embodiment, the spring detents 80 allow movement of the extension ring 304 in a rearward direction, and the spring fingers 126 of the detents make a "clicking" noise as they move over the grooves 112 in the extension ring 304. Once the pre-assembled unit is pushed to its final installed position, the spring fingers 126 received in respective grooves 112 resist movement in the reverse (forward) direction to lock the unit in place.

Unlike conventional methods, the installation of the pre-assembled unit 300 takes only a matter of seconds to complete. Further, the method of installation can be performed by unskilled (less expensive) labor. Also, as previously noted, the above method of installation using a pre-assembled unit reduces the amount of lead time needed to purchase the components of the unit and makes any last-minute design changes easy to accommodate.

FIGS. 16A-16D illustrates a third embodiment of an adjustable-depth ring assembly of this invention, generally designated 500. In general, the assembly 500 comprises (i) an extension ring 504 sized for reception in a central opening 506 of a box cover plate 310 (FIG. 17) attached to an electrical box 320, (ii) an electrical device or devices 524 received in a cavity 528 defined by the extension ring, and (iii) a finish cover plate 530 attached by suitable fasteners 534 to the electrical device(s) at a location in front of the extension ring. The extension ring 504, electrical device(s) 524 and finish cover plate 530 are fastened together to form a pre-assembled unit (also designated by the reference number 500). The unit is free of any connection with the box cover plate 310 and electrical box 320 prior to field installation, as will be described. The parts of the pre-assembled unit 500 will typically (but not necessarily) be assembled at a location remote from the job site, desirably at a time only shortly before the unit is needed to complete an installation at the job site, thus minimizing the lead time required to purchase and stock the parts. The short lead time is also beneficial because any last-minute design changes requiring different parts can be taken into account when making the pre-assembled unit 500.

The extension ring 504, electrical device(s) 524, and finish cover plate 530 are substantially the same as described in the second embodiment. In addition, an extender is 540 is attached to a back end of the extension ring 504 for extending an axial length (i.e., the front-to-back dimension) of the extension ring. The extender 540 is a four-sided sleeve-like structure having substantially the same shape as the extension ring 504. The axial length of the extension ring 504 can vary as needed or desired (e.g., 0.75 in.). The extender 540 is attached to the back end of the extension ring 504 by suitable fasteners, such as screws 544 extending through openings in tabs 546 at the front side of extender and threaded in openings in aligned tabs 548 at the back side of the extension ring. The extender 540 has grooves 552 aligned with the grooves 112 in the extension ring 504 for engagement by the detents 80 on the box cover plate 310.

If desired, multiple extenders 540 can be stacked one behind another and attached to the extension ring 504 to increase the axial length of the extension ring by any number of increments (each increment corresponding to the axial length of one extender 540). The length of the screws 544 will vary depending on the number of extenders 540 used.

The electrical devices 524 are secured to the extension ring 504 by fasteners 564 (e.g., screws) extending through fastener holes (not shown) in upper and lower tabs 572, 574 on the electrical device(s) and threaded through fastener holes 565 in corresponding tabs 566 at the front of the extension ring. Each electrical device 524 has a quick connector 534 for connecting the wiring 538 of the device to corresponding wiring 540 in the electrical box 320 (FIGS. 17 and 22). In one embodiment, the quick connector 534 comprises a first plug component 544 provided as part of the electrical device 524. This plug component 544 is configured to mate with the second plug component 306 provided as part of the wiring 340 in the box 320 (see FIG. 17). Other types of quick connectors are possible.

The abutment device 580 comprises upper and lower abutment plates 582, 584. The abutment plates are secured to the extension ring 504 by the fasteners 564 on the electrical device(s) 524. The fasteners 564 extend through respective fastener openings 586 in the abutment plates 582, 584 and are threaded into respective holes 565 in the tabs 566 on the extension ring 504. As shown best in FIG. 16B, each fastener opening 586 has a generally horizontal portion 586A and a generally vertical portion 586B. The horizontal portion 586A of the opening 586 is formed by an operation (e.g., a lancing operation) that creates two opposing L-shaped fingers 588 spaced from back surface of the corresponding abutment plate 582, 584. The two fingers 588 define a slot or guideway 590 for receiving a respective tab 566 on the extension ring 504 (see FIG. 16D).

The vertical portions 586B of the openings 586 are optional and are provided to accommodate electrical devices having different vertical spacings between the fastener holes in the tabs 572, 574 of the electrical devices 524. In other embodiments, the vertical portions 586B of the openings 586 are eliminated.

The abutment plates 582, 584 are installed by inserting the tabs 566 into respective guideways 590 of the abutment plates to positions in which the fingers 588 abut respective upper and lower inside surfaces of the extension ring 504. (See FIGS. 16C and 16D; 16D shows a tab 566 inserted in one of the guideways 590 of the upper abutment plate 582.) As thus positioned, the upper abutment plate 582 projects above the perimeter (upper wall) of the extension ring 504 the desired distance for abutment with the front surface of the wall member in which extension ring is to be mounted, and the lower abutment plate 584 projects the desired distance below the perimeter (lower wall) of the extension ring 504 for abutment with the wall in which extension ring is to be mounted. Further, the holes 565 in the tabs 566 are substantially centered with respect to the horizontal and vertical portions 586A, 586B of respective openings for receiving the fasteners 564. That is, each hole 565 lies substantially at the intersection of the horizontal centerline of the horizontal portion 586A of the opening and the vertical centerline of the vertical portion 586B of the opening.

The abutment plates 582, 584 are temporarily held in position before and during attachment of the electrical devices 524 to the extension ring 504 by a holding mechanism generally indicated at 594. As shown best in FIG. 16B, this mechanism comprises raised regions or dimples 596 projecting rearward from the back surface of each abutment plate 582, 584. Two elongate dimples 596 are provided at opposite sides of the vertical portion 586B of each opening 586. The number and shape of the dimples may vary. For example, the dimples may be circular in shape.

Figure 16A:
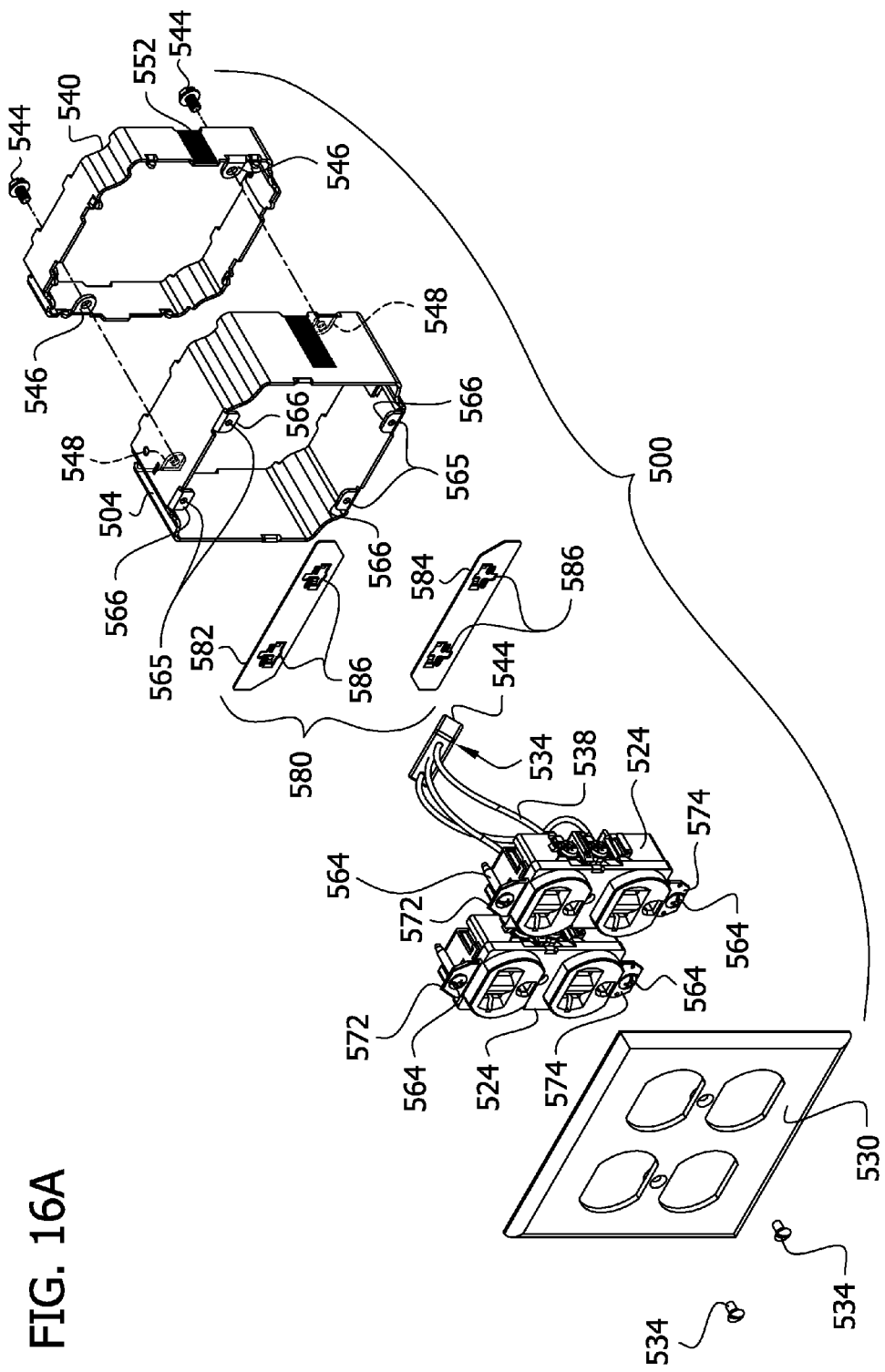
FIG. 16A is an exploded perspective of a third embodiment of an adjustable-depth ring assembly of this invention.
Figure 16B:
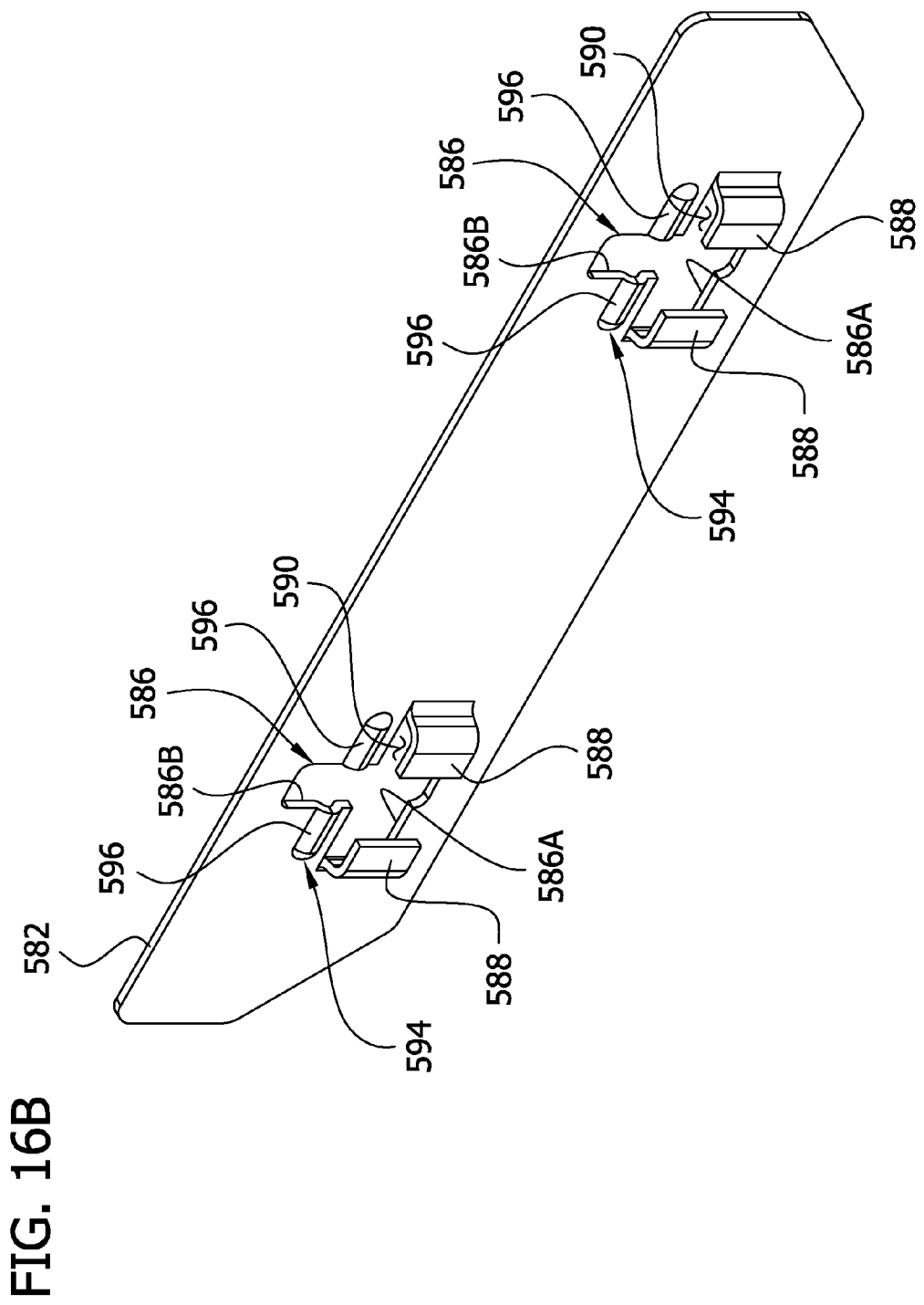
FIG. 16B is a rear perspective of an abutment plate of the ring assembly of FIG. 16A.
Figure 16C:
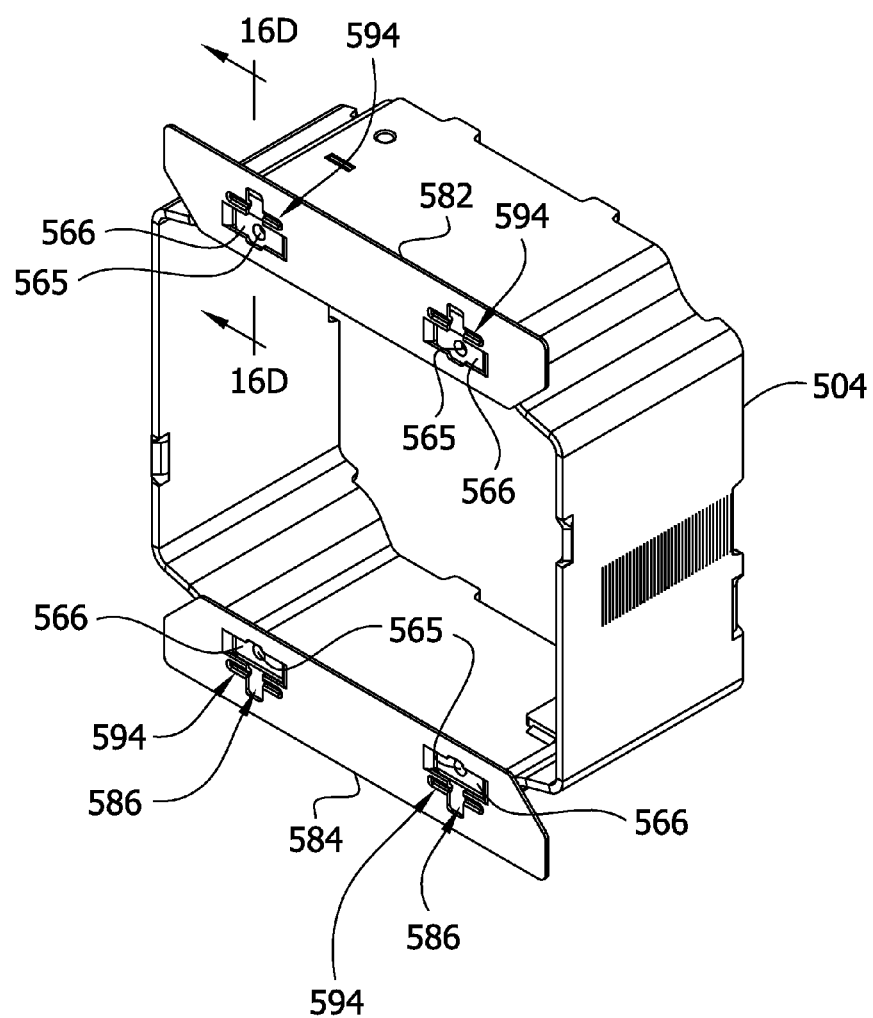
FIG. 16C is a front perspective of the ring assembly of FIG. 16A showing upper and lower abutment plates in position on an extension ring of the assembly.
Figure 16D:
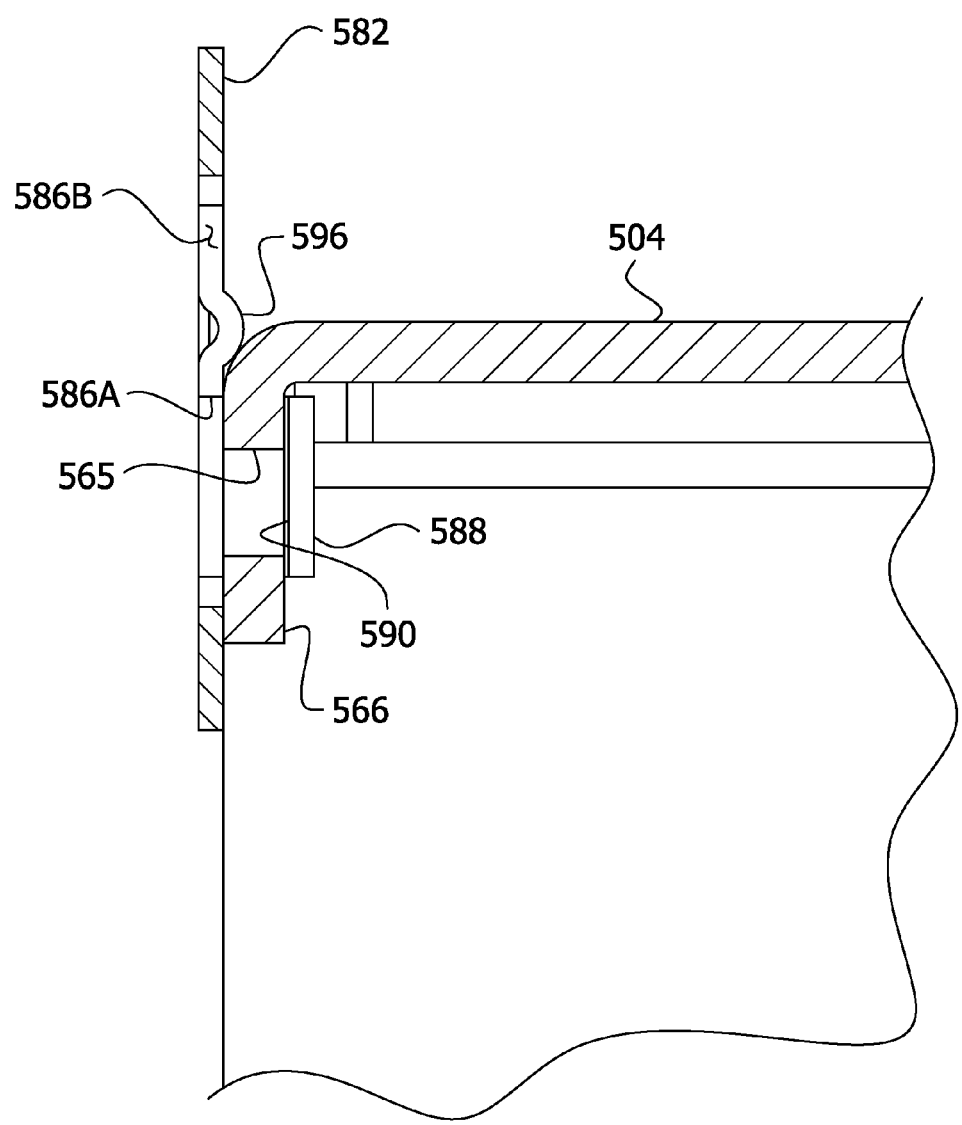
FIG. 16D is an enlarged vertical section taken in the plane of lines 16D-16D of FIG. 16C.

Desirably, the abutment plates 582, 584 are of spring steel, and the arrangement is such that the tabs 566 snap into position in respective guideways 590, as exemplified by the tab 566 in guideway 590 in FIG. 16D. In this position, the fingers 588 on the upper abutment plate 582 substantially abut the upper inside surface of the extension ring 504; root portions of the two upper tabs 566 on the extension ring 504 contact respective dimples 596 on the upper abutment plate to hold (temporarily) the abutment plate in proper position; and the openings 586 in the upper abutment plate are aligned with the holes 565 in respective tabs 566 of the extension ring for insertion of fasteners 564 through respective openings 586 into threaded engagement with respective holes 565 in the tabs. Similarly, the fingers 588 on the lower abutment plate 582 substantially abut the lower inside surface of the extension ring 504; root portions of the two lower tabs 566 on the extension ring 504 contact respective dimples 596 on the lower abutment plate to hold (temporarily) the abutment plate in proper position; and the openings 586 in the lower abutment plate are aligned with the holes 565 in respective lower tabs 566 of the extension ring for insertion of fasteners 564 through respective openings 586 into threaded engagement with respective holes 565 in the tabs.

Desirably, the thickness of each tab 566 is somewhat greater than the spacing between respective fingers 588 and the back surface of the abutment plate 582, 584 so that the tab is resiliently clamped in the guideway 590 and held in place by respective dimples 596 prior to threading the fasteners 564 into holes 565.

As illustrated in FIGS. 16A-16C, the upper abutment plate 582 is formed as a single continuous elongate strip of material. However, the single strip could be replaced by two separate shorter members, one for each upper tab 566 of the extension ring 504. Similarly, the lower abutment plate 584 could be formed as two separate shorter members, one for each lower tab 566 on the extension ring.

The adjustable-depth ring assembly 500 shown in FIGS. 16A-16D is a two-gang assembly comprising two electrical devices 324 positioned side-by-side. In other embodiments, the ring assembly may comprise only one electrical device, or it may comprise three or more electrical devices positioned side-by-side. The abutment devices used in these other embodiments may be substantially the same as described above except that the size (horizontal length) of each abutment plate and the number of openings in each abutment plate will vary depending on the number of electrical devices 324 in the assembly.

FIGS. 25-31 illustrate a cover assembly, generally designated 400. The cover assembly 400 of this embodiment includes a thin flat box cover plate 406 having a central opening 408 without a forward-protruding collar around it, similar to the cover plate 310 of the previous embodiment. The central opening 408 is generally rectangular in this embodiment, but it may have other shapes, e.g., circular. As in the previous embodiment, the box cover plate 406 is adapted to be mounted on a front side of an electrical box 412 with the central opening 408 in registration with a recess in the electrical box for receiving one or more electrical devices.

Spring detent devices 416 (similar to spring detents 80 in the previous embodiment) are mounted on the box cover plate 406 at opposite sides of the central opening 408 for engaging an extension ring received in the central opening 408 of the cover plate, such as the extension ring 304 described in the previous embodiment.

Figure 25:
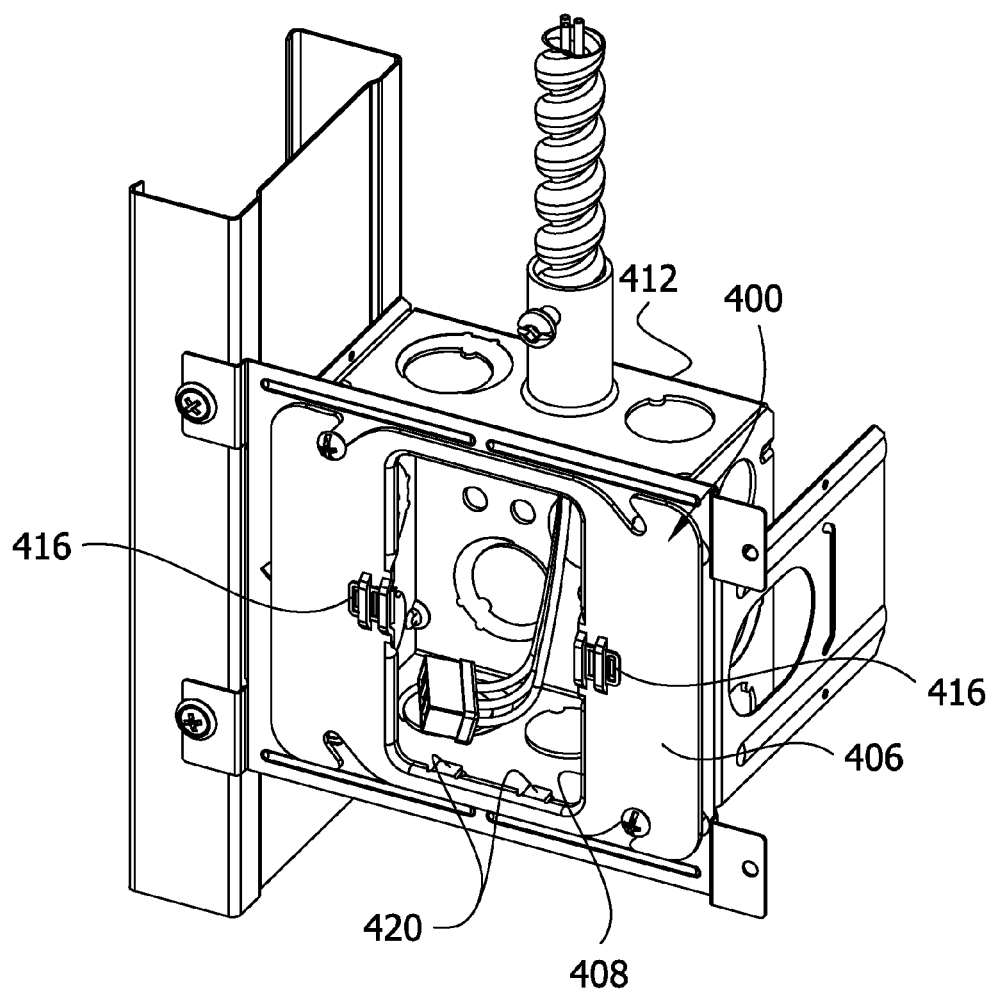
FIG. 25 is a perspective of a different cover assembly of this invention installed on an electrical box, the temporary cover of the assembly being removed to show details of the cover plate.
Figure 26:
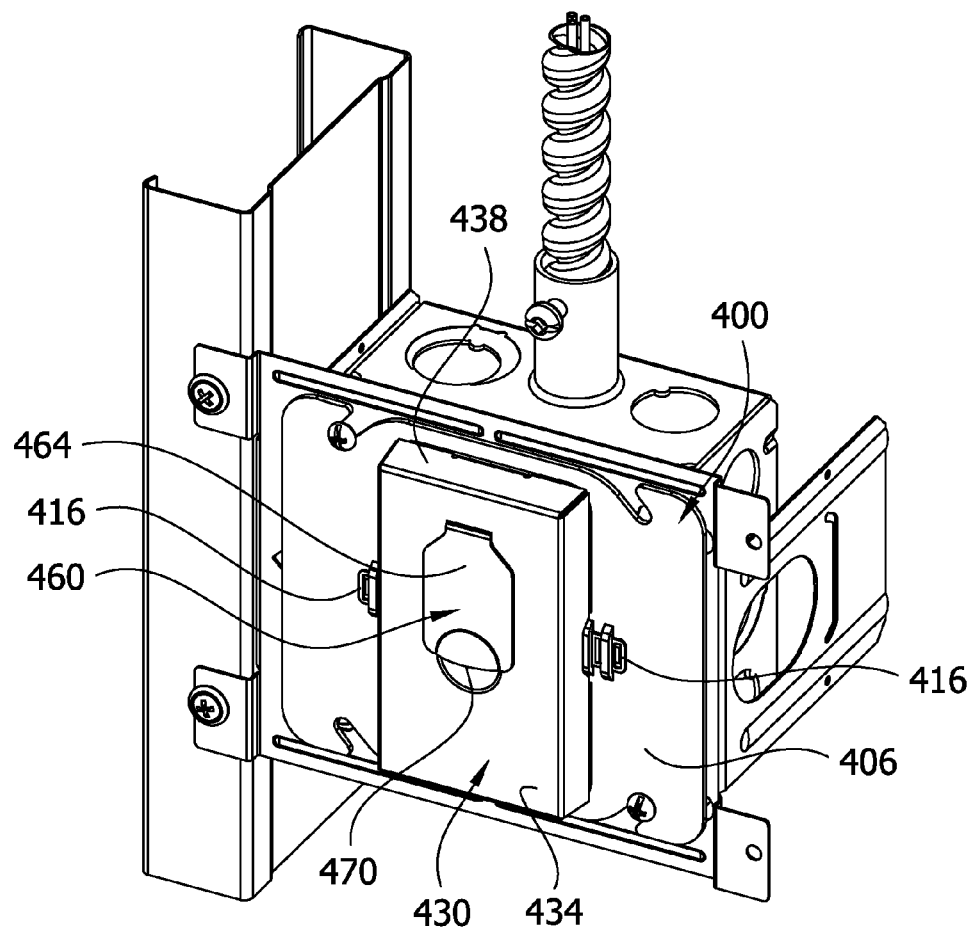
FIG. 26 is a view similar to FIG. 25 but showing the temporary cover installed on the cover plate.
Figure 27:
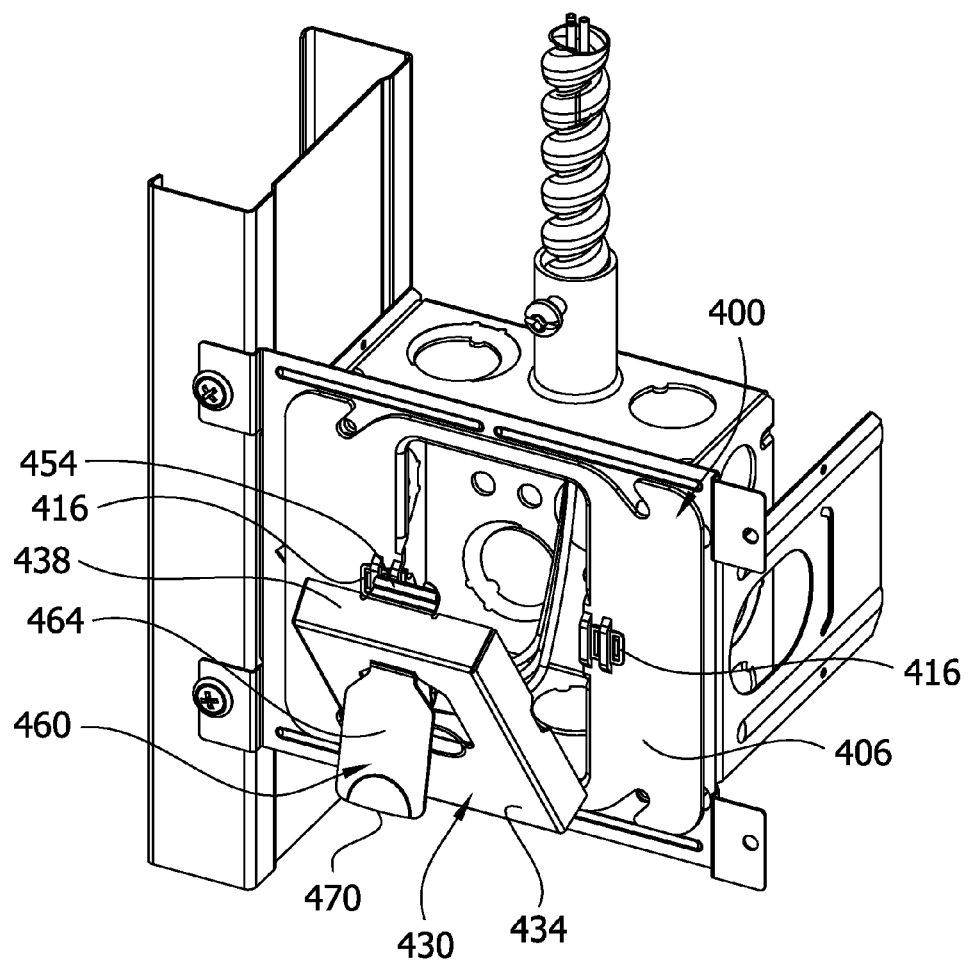
FIG. 27 is a view similar to FIG. 26 but showing the temporary cover being removed from the cover plate.
Figure 28:
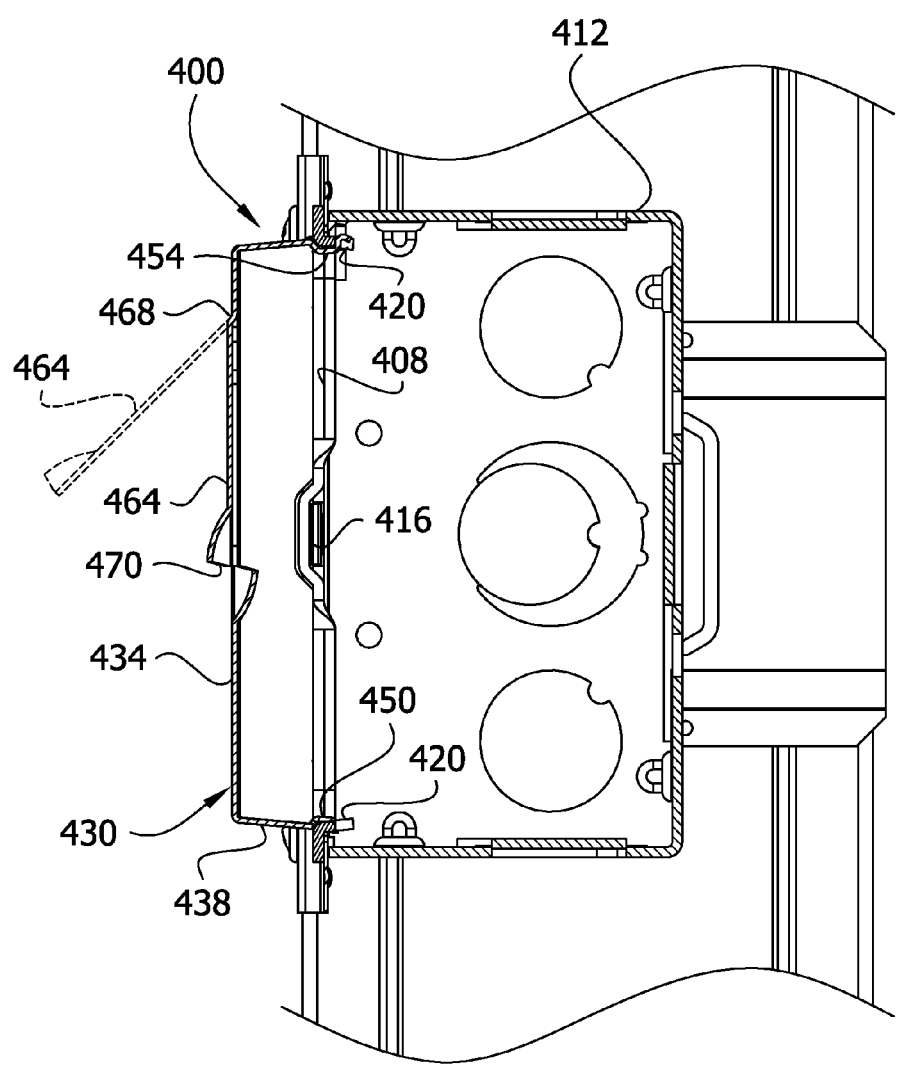
FIG. 28 is a sectional view of the cover assembly installed on the electrical box.
Figure 29:
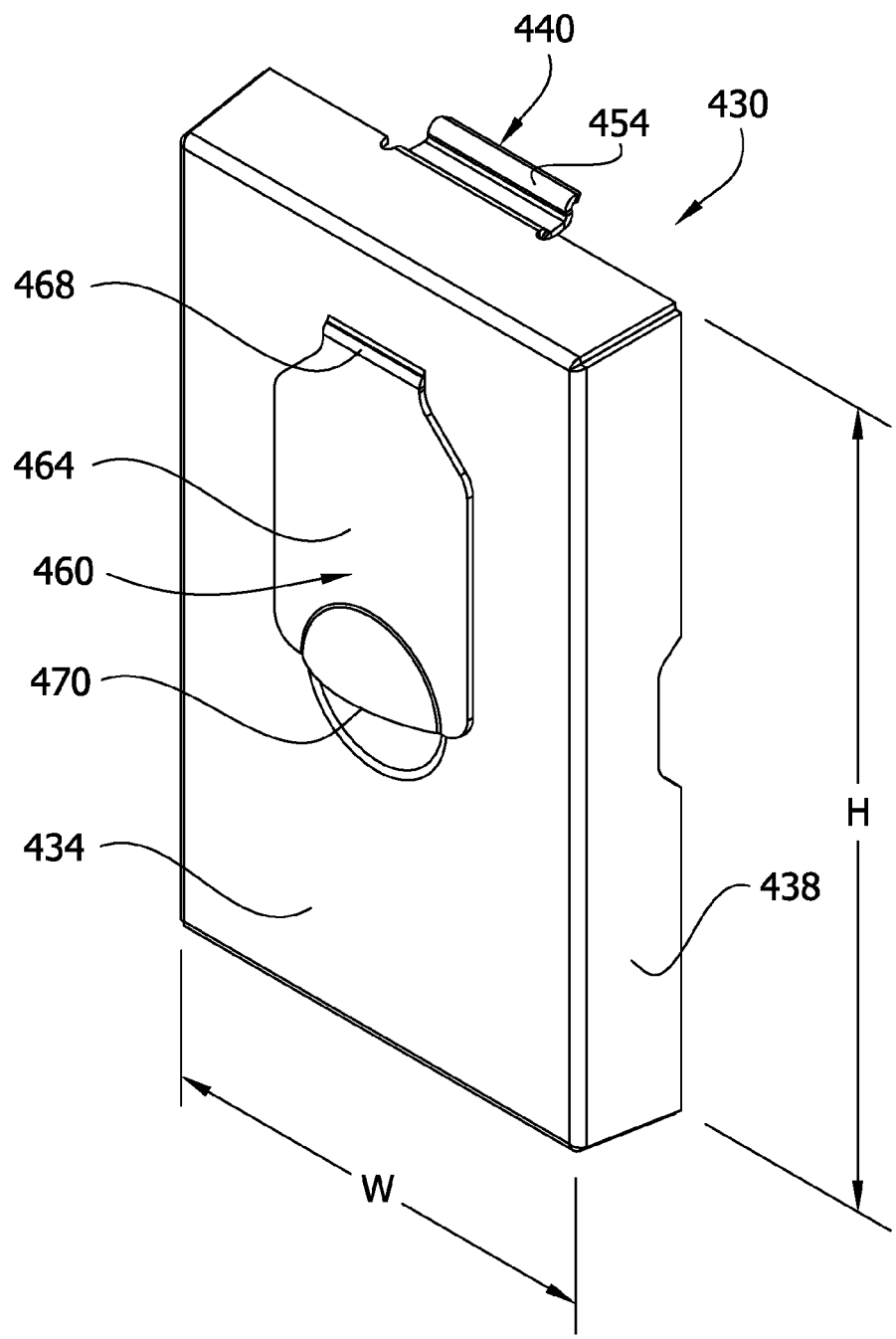
FIG. 29 is a front perspective of the temporary cover.

As shown best in FIGS. 25 and 28, at least one and preferably two or more grounding tabs 420 extend rearward from respective upper and lower edges of the central opening 408 of the box cover plate 406. By way of example but not limitation, two grounding tabs 420 may extend rearward from the lower edge of the central opening 408, and two grounding tabs 420 may extend rearward from the upper edge of the central opening. (The upper grounding tabs are not visible in FIG. 25.) The grounding tabs 420 are configured for electrical grounding engagement with respective upper and lower sides of an extension ring received in the opening 408. The extension ring (not shown in FIG. 26) to be received in the central opening 408 is identical to the extension ring 304 described in the previous embodiment (see FIG. 23).

Figure 31:
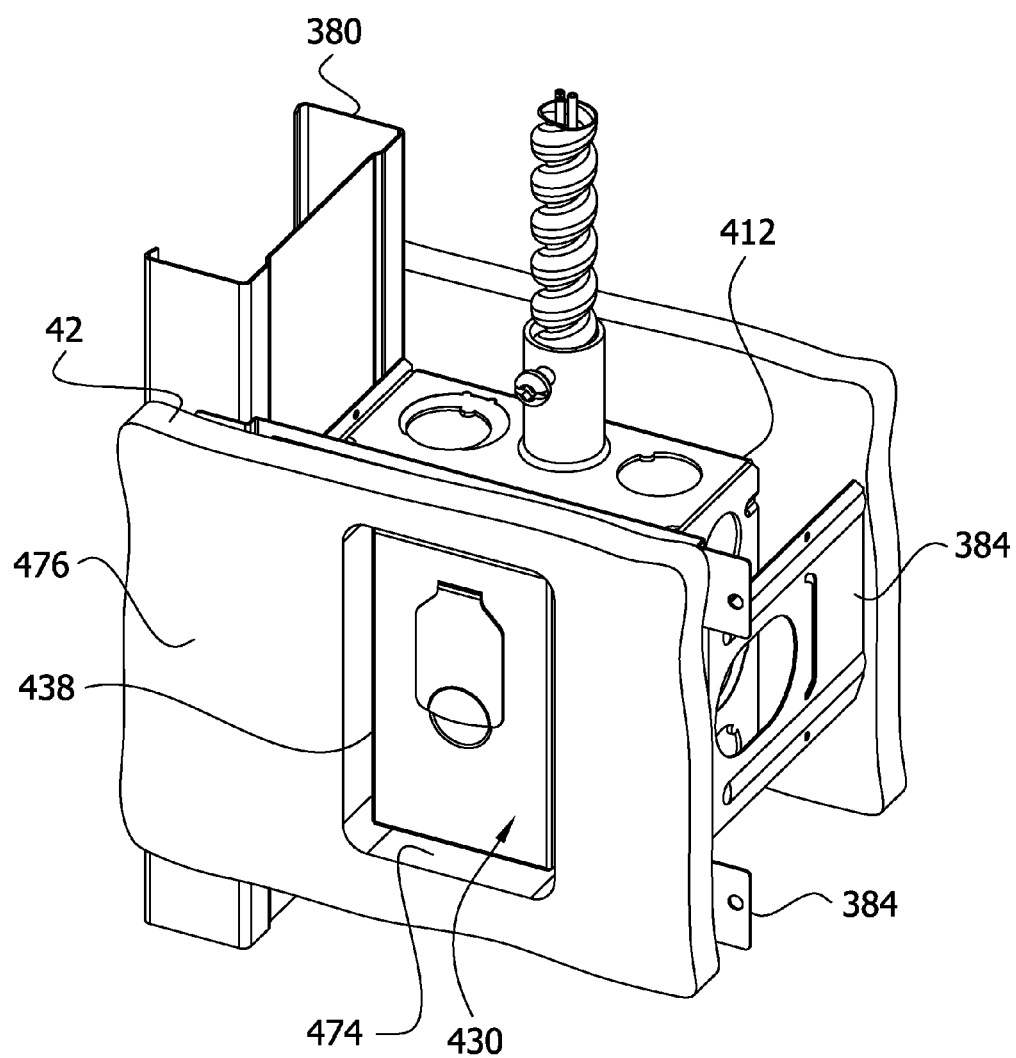
FIG. 31 is a front perspective view showing an opening cut in a wall member using the rim of the temporary cover as a guide.

The cover assembly 400 also includes a removable temporary cover, generally designated 430, for covering the central opening 408 in the box cover plate 406 prior to and during installation of the wall member (e.g., drywall 476 in FIG. 31). The removable cover comprises a front wall 434, a side wall extending rearward from the front wall and forming a rim 438 around the periphery of the front wall, and a connecting mechanism 440 on the rim for releasably connecting the temporary cover 430 to the box cover plate 406 in a position in which the front wall 434 of the cover is spaced forward from the central opening 408 in the box cover plate.

Figure 30:
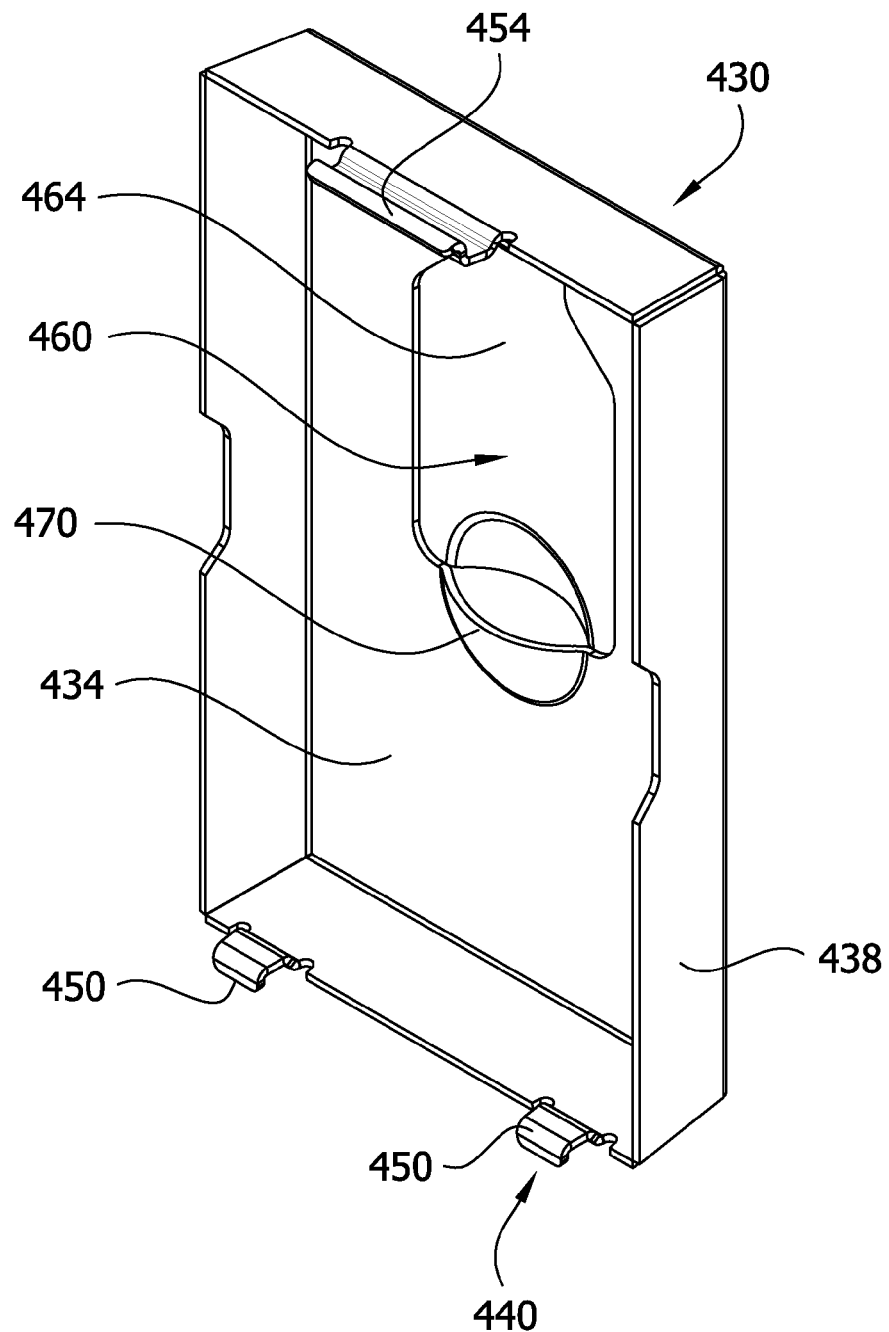
FIG. 30 is a rear perspective of the temporary cover.

A best illustrated in FIG. 30, the connecting mechanism 440 comprises a pair of hook-shaped latch members 450 on a lower portion of the rim 438 of the cover 430 configured for latching engagement with the lower edge of the central opening 408 in the box cover plate 406, and a spring latch member 454 on an upper portion of the rim 438 of the cover configured for latching engagement with the upper edge of the central opening 408 in the box cover plate. To install the temporary cover 430, the hook-shaped latch members 450 are hooked over the lower edge of the opening 408, and the cover is then pivoted to snap the resilient spring latch member 454 into underlying latching engagement with the upper edge of the opening 408, as shown in FIG. 28. Other connecting mechanisms may be used for releasably connecting the temporary cover 430 to the box cover plate 406.

A release mechanism 460 is provided on the front wall 434 of the temporary cover 430 for removing the cover from the box cover plate 406. The release mechanism comprises a pull tab 464 attached to the front wall 434 of the temporary cover. The pull tab 464 is movable from a no-pull position (FIG. 26) in which it is generally flush with the front wall 434 of the temporary cover 430 and a pull position (FIG. 27) in which it extends forward from the front wall so that it can be pulled to remove the cover from the box cover plate. (The no-pull and pull positions are shown in solid lines and in phantom lines, respectively, in FIG. 28). In the embodiment shown in the drawings, the pull tab 464 is formed as one piece with the front wall 434 of the temporary cover 430 and is bendable about a bend or hinge line 468 adjacent the upper end of the pull tab for movement from its no-pull position and its pull position. The lower end of the pull tab 464 and an adjacent portion of the front wall 434 of the cover are configured to form a finger grip 470 to facilitate moving the pull tab from its no-pull position to its pull position.

Referring to FIG. 31, the rim 438 of the temporary cover 430 is configured to function as a guide for guiding a cutting tool to cut an opening 474 in the wall member 476 (e.g., drywall) prior to installing an electrical device or devices in the electrical box 412 in a manner described in the previous embodiments. In this particular embodiment, the rim 438 of the cover 430 is rectangular and has peripheral dimensions (height H and width W in FIG. 29) generally corresponding to peripheral dimensions (height and width) of the central opening 408 in the box cover plate 406. The rim 438 and central opening 406 may have other shapes (e.g., polygonal or round) corresponding to the shape of the recess in the electrical box. By configuring the rim of the cover 438 in this manner, a cutting tool such as a router can be moved along and around the outer surface of the rim (using the rim as a guide) to cut the opening 474 of proper size and shape in the wall member 476 prior to installation of the electrical device(s) in the electrical box 412.

Figure 32:
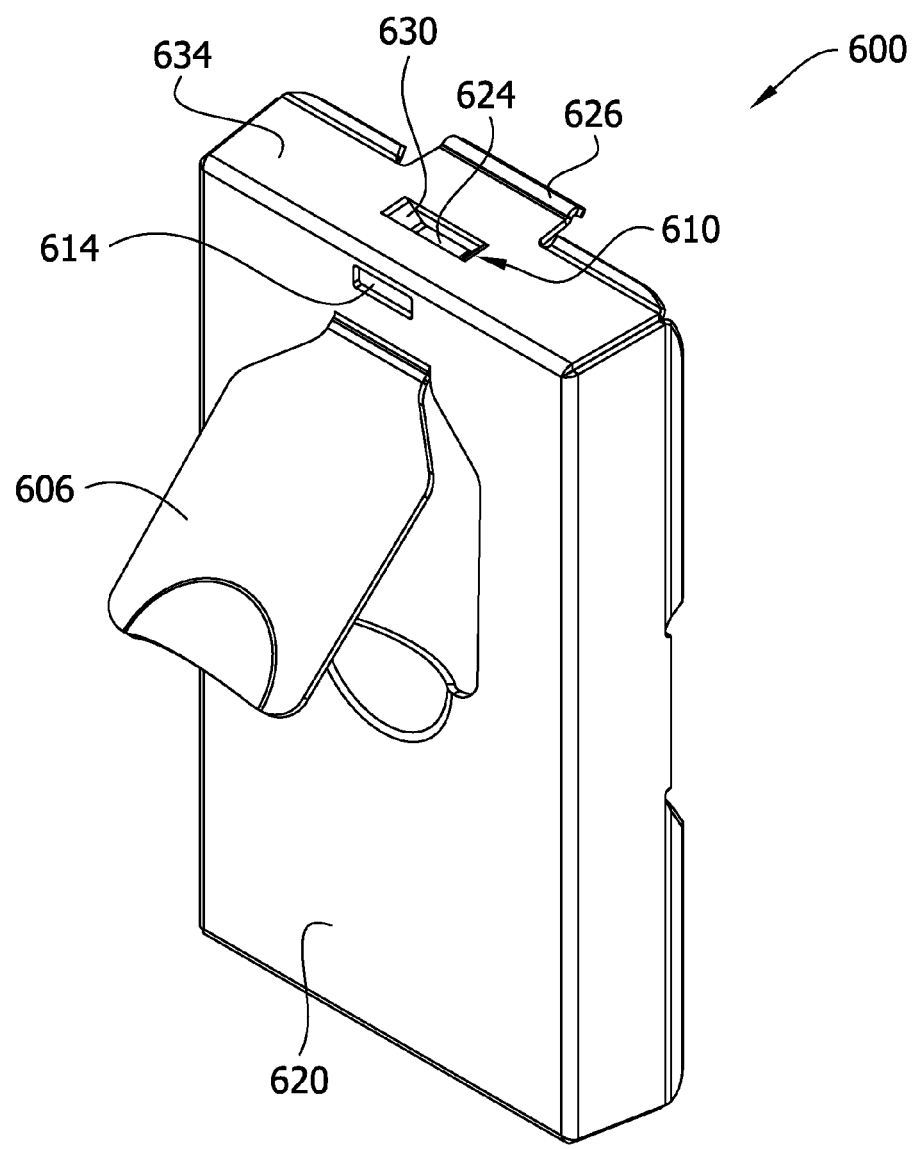
FIG. 32 is a front perspective of a second embodiment of the temporary cover.
Figure 33:
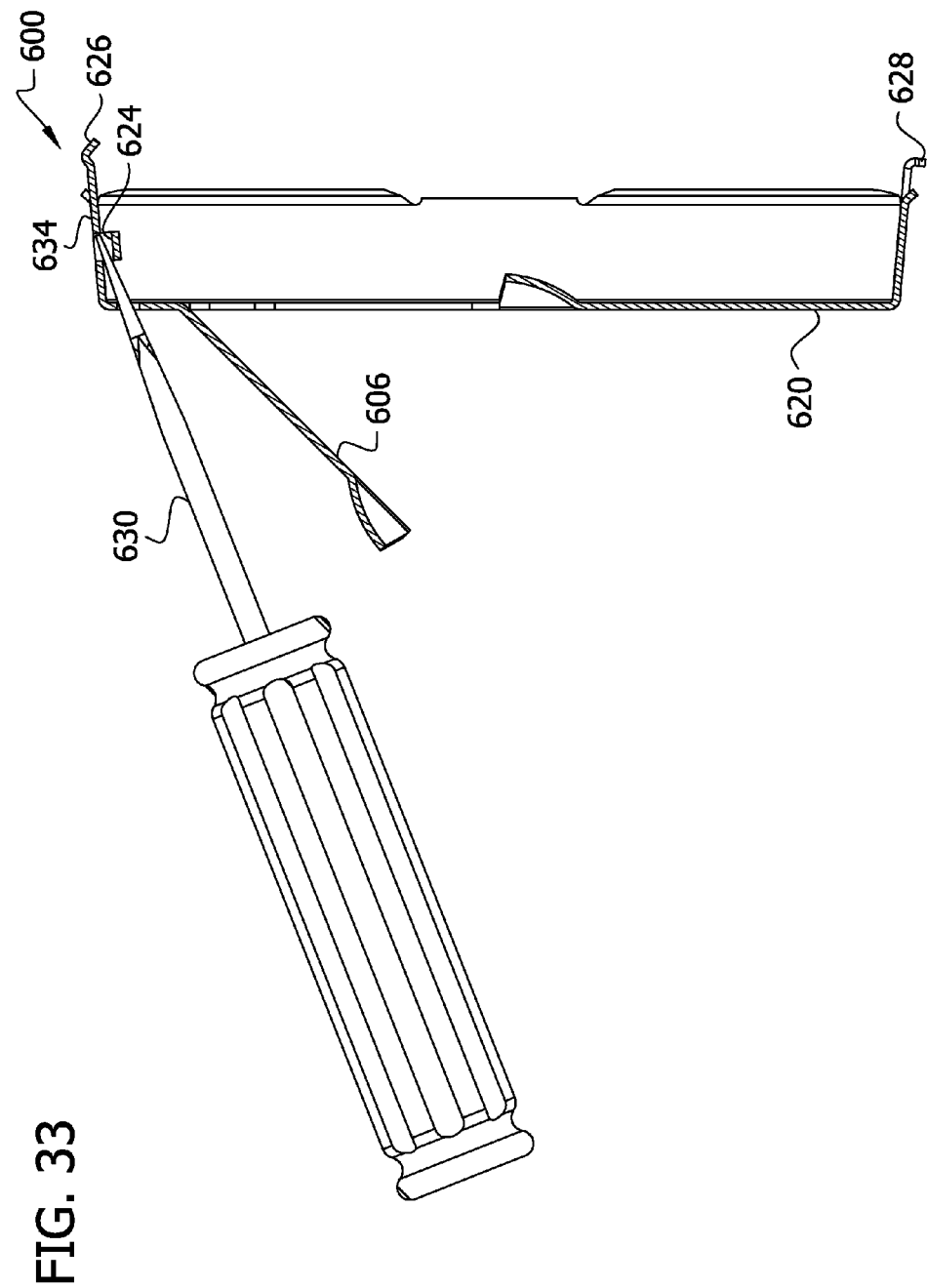
FIG. 33 is a cross-sectional view of the temporary cover of FIG. 32 illustrating how a tool (e.g., screw driver) may be used to removed the cover from a box cover plate.

FIGS. 32 and 33 illustrate an alternative embodiment of a temporary cover 600 for a box cover plate (not shown). The cover 600 is substantially identical to the temporary cover 430 described above, except that, in addition to the pull tab 606, the cover has a second release mechanism, generally designated 610. This mechanism comprises a tool opening 614 (e.g., slot) in the front wall 620 of the cover and a leveraging surface 624 adjacent one of the latch members 626, 628 (the upper latch member 626 as illustrated). The leveraging surface 624 illustrated in FIGS. 32 and 33 is defined by a rectangular portion 630 of the cover punched down from the top wall 634 of the cover. However, the leveraging surface may have other configurations and be formed in other ways.

As illustrated in FIG. 33, a tool 630 (e.g., a flat-blade screw driver) may be inserted through the tool opening 614 and into engagement with the leveraging surface 624 for applying a force tending to unlatch the latch member 626. In the illustrated embodiment, the force applied to the surface 624 is a downward force which deflects the top wall 634 of the cover and the upper latch member 626 in a downward direction a distance sufficient to aid in disengaging the upper latch member from the box cover plate so that the temporary cover 600 may be removed.

The tool opening 614 and leveraging surface 624 can be used as a release mechanism that either supplements or replaces use of the pull tab 606.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions products without departing from the scope of the invention, it is intended that all matter contained in the above description and shown in the accompanying drawings shall be interpreted as illustrative and not in a limiting sense.

What is claimed is:

1. A cover assembly for an electrical box that is accessible through a wall opening in a wall member disposed forward of the electrical box, comprising
 a box cover plate having a central opening without a forward protruding collar around it, said box cover plate being adapted to be mounted on a front side of the electrical box and rearward of the wall member with the central opening in registration with a recess in the electrical box and said wall opening,
 spring detent devices on the box cover plate at opposite edges of the central opening for engaging an extension ring received in the central opening of the box cover plate,
 at least one grounding tab extending rearward from an edge of the central opening of the box cover plate, said at least one ground tab being configured for electrical grounding engagement with said extension ring, and
 a temporary cover for covering the central opening in the box cover plate, said temporary cover comprising
  a front wall,
  a side wall extending rearward from the front wall and forming a rim around the periphery of the front wall,
  a connecting mechanism on the rim for releasably connecting the temporary cover to the box cover plate in a position in which the front wall of the temporary cover is spaced forward from the central opening in the box cover plate, and
  a release mechanism on the front wall for removing the temporary cover from the box cover plate,
  said rim of the temporary cover being configured to function as a guide for guiding a cutting tool to cut an opening in the wall member prior to installing an electrical device in the electrical box.

2. The cover assembly of claim 1, wherein the temporary cover has peripheral dimensions corresponding to peripheral dimensions of the central opening in the box cover plate.

3. The cover assembly of claim 2, wherein said connecting mechanism comprises latch members on upper and lower portions of the rim of the temporary cover configured for latching engagement with corresponding edges of the central opening in the box cover plate, at least one of the latch members being a spring latch member.

4. The cover assembly of claim 3, wherein said release mechanism comprises a pull tab attached to the front wall of the temporary cover.

5. The cover assembly of claim 4, wherein one end of the pull tab movable from a no-pull position in which it is generally flush with the front wall of the temporary cover to a pull position in which it extends forward from the front wall so that it can be pulled to remove the temporary cover from the box cover plate.

6. The cover assembly of claim 5, wherein the temporary cover also includes a second release mechanism comprising a tool opening in the front wall of the cover and a leveraging surface adjacent one of said latch members whereby a tool may be inserted through the tool opening and into engagement with said leveraging surface for applying a force tending to unlatch said one latch member.

7. The cover assembly of claim 2, wherein the release mechanism comprises a tool opening in the front wall of the cover and a leveraging surface adjacent one of said latch members whereby a tool may be inserted through the tool opening and into engagement with said leveraging surface for applying a force tending to unlatch said one latch member.

8. The cover assembly of claim 1, further comprising a rearward protruding collar around the central opening in the box cover plate.

9. A temporary cover for covering a central opening in a box cover plate for an electrical box, said temporary cover comprising
 a front wall,
 a side wall extending rearward from the front wall and forming a rim around the periphery of the front wall,
 a connecting mechanism on the rim for releasably connecting the temporary cover to the box cover plate in a position in which the front wall of the temporary cover is spaced forward from the central opening in the box cover plate, and
 a release mechanism on the front wall for removing the temporary cover from the box cover plate,
 said rim of the temporary cover being configured to function as a guide for guiding a cutting tool to cut an opening in the wall member prior to installing an electrical device in the electrical box,
 wherein said connecting mechanism comprises latch members on upper and lower portions of the rim of the temporary cover configured for latching engagement with corresponding edges of the central opening in the box cover plate, at least one of the latch members being a spring latch member, wherein said release mechanism comprises a pull tab attached to the front wall of the temporary cover, wherein one end of the pull tab is movable from a no-pull position in which it is generally flush with the front wall of the temporary cover to a pull position in which it extends forward from the front wall so that it can be pulled to remove the temporary cover from the box cover plate, and wherein the temporary cover also includes a second release mechanism comprising a tool opening in the front wall of the cover and a leveraging surface adjacent one of said latch members whereby a tool may be inserted through the tool opening and into engagement with said leveraging surface for applying a force tending to unlatch said one latch member.

10. A temporary cover for covering a central opening in a box cover plate for an electrical box, said temporary cover comprising a front wall, a side wall extending rearward from the front wall and forming a rim around the periphery of the front wall, a connecting mechanism on the rim for releasably connecting the temporary cover to the box cover plate in a position in which the front wall of the temporary cover is spaced forward from the central opening in the box cover plate, and a release mechanism on the front wall for removing the temporary cover from the box cover plate, said rim of the temporary cover being configured to function as a guide for guiding a cutting tool to cut an opening in the wall member prior to installing an electrical device in the electrical box, wherein said connecting mechanism comprises latch members on upper and lower portions of the rim of the temporary cover configured for latching engagement with corresponding edges of the central opening in the box cover plate, at least one of the latch members being a spring latch member, and wherein the release mechanism comprises a tool opening in the front wall of the cover and a leveraging surface adjacent one of said latch members whereby a tool may be inserted through the tool opening and into engagement with said leveraging surface for applying a force tending to unlatch said one latch member.

11. The cover assembly of claim 10 in combination with said box cover plate, said box cover plate comprising a rearward protruding collar defining the central opening in the box cover plate.

\* \* \* \* \*